US012302170B2

(12) United States Patent
Zhu et al.

(10) Patent No.: US 12,302,170 B2
(45) Date of Patent: May 13, 2025

(54) CONFIGURATION METHOD, COMMUNICATION APPARATUS, AND COMMUNICATION SYSTEM

(71) Applicant: HUAWEI TECHNOLOGIES CO., LTD., Guangdong (CN)

(72) Inventors: Yuanping Zhu, Shanghai (CN); Yulong Shi, Beijing (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 421 days.

(21) Appl. No.: 17/672,337

(22) Filed: Feb. 15, 2022

(65) Prior Publication Data

US 2022/0174538 A1 Jun. 2, 2022

Related U.S. Application Data

(63) Continuation of application No. PCT/CN2019/100839, filed on Aug. 15, 2019.

(51) Int. Cl.
*H04W 28/06* (2009.01)
*H04L 1/00* (2006.01)
(Continued)

(52) U.S. Cl.
CPC .......... *H04W 28/06* (2013.01); *H04L 1/0006* (2013.01); *H04W 28/0268* (2013.01); *H04W 80/02* (2013.01)

(58) Field of Classification Search
CPC . H04W 28/06; H04W 28/0268; H04W 80/02; H04W 88/085; H04W 28/0263;
(Continued)

(56) References Cited

U.S. PATENT DOCUMENTS 11,510,131 B2 * 11/2022 Zhu ................. H04W 40/24
2019/0159277 A1 5/2019 Zhu et al.
(Continued)

FOREIGN PATENT DOCUMENTS

CN 109565703 A 4/2019
EP 3100493 B1 12/2018
(Continued)

OTHER PUBLICATIONS

Office Action issued in Indian Application No. 202217010024 on Jul. 19, 2022, 8 pages.
(Continued)

*Primary Examiner* — Hoang-Chuong Q Vu
(74) *Attorney, Agent, or Firm* — Fish & Richardson P.C.

(57) ABSTRACT

Embodiments of this application disclose various methods and systems. One example method comprises receiving first configuration information from a donor centralized unit (CU). The first configuration information indicates that when one or more respective values of one or more first fields in a data packet correspondingly meets respective first value ranges of the first fields, the data packet is transmitted through a first channel between the donor distributed unit (DU) and a child node. The first configuration information is stored. In a second example, first configuration information is obtained indicating that when one or more respective values of one or more first fields in a data packet meet one or more respective first value ranges of the one or more first fields, the data packet is transmitted through a first channel between a donor DU and a child node, and the first configuration information is sent to the donor DU.

20 Claims, 9 Drawing Sheets

(51) Int. Cl.
*H04W 28/02* (2009.01)
*H04W 80/02* (2009.01)

(58) Field of Classification Search
CPC ....... H04L 1/0006; H04L 5/001; H04L 5/003; H04L 5/0035; H04L 5/0094; H04L 47/2408; H04L 47/2491
See application file for complete search history.

(56) References Cited

U.S. PATENT DOCUMENTS

| | | | | |
|---|---|---|---|---|
| 2020/0252847 | A1* | 8/2020 | Park | H04W 80/02 |
| 2021/0051512 | A1* | 2/2021 | Hampel | H04W 80/06 |
| 2021/0168646 | A1* | 6/2021 | Chen | H04W 88/14 |
| 2021/0345211 | A1* | 11/2021 | Keskitalo | H04W 84/047 |
| 2021/0377805 | A1* | 12/2021 | Liu | H04W 28/12 |
| 2021/0377930 | A1* | 12/2021 | Liu | H04W 72/1273 |
| 2022/0183090 | A1* | 6/2022 | Mildh | H04W 76/20 |
| 2022/0272564 | A1* | 8/2022 | Teyeb | H04W 76/11 |
| 2022/0279552 | A1* | 9/2022 | Teyeb | H04W 40/22 |
| 2022/0377595 | A1* | 11/2022 | Barac | H04W 28/0236 |

FOREIGN PATENT DOCUMENTS

| | | |
|---|---|---|
| JP | 2012523776 A | 10/2012 |
| WO | 2019137504 A1 | 7/2019 |

OTHER PUBLICATIONS

Extended European Search Report issued in European Application No. 19941642.1 on Aug. 4, 2022, 11 pages.

Huawei, "Bearer Mapping in IAB donor-DU and IAB node," 3GPP TSG-RAN WG3 Meeting #103bis, R3-191839, Xi'an, China, Apr. 8-12, 2019, 4 pages.

Huawei, "Backhaul RLC bearer management," 3GPP TSG-RAN WG3 meeting #103bis, R3-191837, Xi'an, China, Apr. 8-12, 2019, 4 pages.

Ericsson, "QoS Mapping to Backhaul Bearers in IAB Networks," 3GPP TSG RAN WG3 Meeting #103, R3-190353, Athens, Greece, Feb. 25-Mar. 1, 2019, 3 pages.

Ericsson (Rapporteur), "Email discussion [105#47] [NR_IAB-Core] Bearer Mapping," 3GPP TSG-RAN WG2 Meeting #105bis, R2-1903964, Xi'an, China, Apr. 8-12, 2019, 18 pages.

Ericsson, "User Plane Architecture Aspects of IAB nodes," 3GPP TSG RAN WG3 Meeting #103bis, R3-191366,Xi'an, China, Apr. 8-12, 2019, 5 pages.

Huawei, "Bearer Mapping in Donor-DU and IAB node," 3GPP TSG-RAN WG3 Meeting #103, R3-190500, Athens, Greece, Feb. 25-Mar. 1, 2018, 3 pages.

PCT International Search Report and Written Opinion issued in International Application No. PCT/CN2019/100839 on May 13, 2020, 15 pages (with English translation).

Qualcomm Incorporated, "IAB transport at IAB-donor DU," 3GPP TSG-RAN WG3 Meeting #104, R3-192478, Reno, USA, May 13-17, 2019, 4 pages.

Huawei et al., "Bearer mapping in IAB network," 3GPP TSG RAN WG2 #106, R2-1906969, Reno, USA, May 13-17, 2019, 3 pages.

Office Action in Japanese Appln. No. 2022-509685, dated Apr. 3, 2023, 9 pages (with English translation).

* cited by examiner

CONFIGURATION METHOD, COMMUNICATION APPARATUS, AND COMMUNICATION SYSTEM

CROSS-REFERENCE TO RELATED APPLICATIONS

This application is a continuation of International Application No. PCT/CN2019/100839, filed on Aug. 15, 2019. The disclosure of the aforementioned application is hereby incorporated by reference in its entirety.

TECHNICAL FIELD

This application relates to the field of communication technologies, and in particular, to a configuration method, a communication apparatus, and a communication system.

BACKGROUND

Compared with a 4th generation mobile communication system, a 5th generation (5G) mobile communication system proposed stricter requirements on various network performance indicators in an all-round manner. For example, a capacity indicator needs to be increased by 1000 times, wider coverage is required, and ultra-reliable and low-latency is required. An integrated access and backhaul (Integrated access and backhaul, IAB) system emerges to provide a flexible and convenient access and backhaul service for a terminal by using a large quantity of densely deployed nodes, thereby improving a coverage area, and meeting a stricter performance indicator of 5G.

In an IAB network, to meet QoS requirements of different data packets, different RLC channels may be established between two nodes in the IAB network, and different data packets may be mapped to different RLC channels for transmission. However, an IAB network topology is relatively complex. When a data packet of any two nodes is not mapped to an appropriate RLC channel between the any two nodes for transmission, QoS performance of the data packet in the entire IAB network may not be ensured. Consequently, user experience is greatly reduced.

SUMMARY

Embodiments of this application provide a configuration method, a communication apparatus, and a communication system, so that a donor DU can determine an RLC channel to which a data packet is to be mapped, and map the data packet to an appropriate RLC channel for transmission, thereby meeting a QoS requirement of the data packet.

According to a first aspect, a configuration method is provided, and the method may be performed by a donor DU or a chip in the donor DU. The method includes:

The donor DU receives first configuration information from a donor CU, where the first configuration information indicates that one or more respective values of one or more reference fields in a data packet is used to determine one or more mapping fields of the data packet, or a quantity of channels between the donor DU and a child node of the donor DU is used to determine one or more mapping fields of a data packet, or the first configuration information indicates one or more mapping fields of a data packet, and the one or more mapping fields are used to determine a channel that is between the donor DU and the child node and that is for transmitting the data packet.

The donor DU receives a first data packet.

The donor DU determines one or more mapping fields of the first data packet based on the first configuration information.

According to the method in which the donor CU indicates the donor DU to determine the one or more mapping fields, mapping fields of the data packet may be determined based on characteristics of different data packets, to ensure that the data packet is mapped to an appropriate RLC channel (channel) for transmission, and a mapping rule may be flexibly set, to meet mapping requirements of a large quantity of data packets in an IAB network.

Optionally, the foregoing channel may be an RLC channel, an RLC bearer, or a logical channel.

Optionally, the method further includes: The donor DU determines, based on the one or more mapping fields, the channel that is between the donor DU and the child node and that is for transmitting the data packet.

To be specific, there are two steps for the donor DU to determine the channel for the data packet. The $1^{st}$ step is to determine the one or more mapping fields, and the $2^{nd}$ step is to determine, based on the one or more mapping fields, the channel for transmitting the data packet.

Optionally, in the foregoing method, the first configuration information indicates that when the one or more respective values of the one or more reference fields correspondingly meets one or more respective first reference value ranges of the one or more reference fields, the one or more mapping fields of the data packet are one or more first fields of the data packet.

Optionally, the first configuration information indicates that when the one or more respective values of the one or more reference fields correspondingly meets one or more respective second reference value ranges of the one or more reference fields, the one or more mapping fields of the data packet are one or more second fields of the data packet.

In other words, the first configuration information may configure a plurality of sets of reference value ranges for the one or more reference fields, and the donor DU may determine one of the plurality of sets of reference value ranges that is met by a data packet received by the donor DU, to determine the one or more mapping fields.

Optionally, the one or more first fields may have a same field as the one or more second fields.

Optionally, the first configuration information includes a mapping relationship between the one or more respective first reference value ranges of the one or more reference fields and the one or more first fields.

Optionally, the first configuration information includes the one or more reference fields.

Optionally, in the foregoing method, the first configuration information indicates that an output value obtained after performing first operation on one or more respective values of a plurality of reference fields in the data packet is used to determine the one or more mapping fields of the data packet.

Optionally, the first configuration information indicates that when the output value obtained after performing the first operation on the one or more respective values of the plurality of reference fields in the data packet meets a value range of the first operation, the one or more mapping fields of the data packet are the one or more first fields of the data packet.

Optionally, the first configuration information includes a mapping relationship between the value range of the first operation and the one or more first fields.

Optionally, the first configuration information indicates that when the output value obtained after performing the first operation on the respective values of the plurality of reference fields in the data packet meets a value range of second operation, the one or more mapping fields of the data packet are the one or more second fields of the data packet.

Optionally, the first configuration information includes the plurality of reference fields.

Optionally, the method further includes:

The donor DU receives second configuration information from the donor CU, where the second configuration information indicates that one or more values of the one or more mapping fields is used to determine the channel that is between the donor DU and the child node and that is for transmitting the data packet.

Optionally, the second configuration information indicates that when the one or more respective values of the one or more mapping fields meets one or more respective first mapping value ranges of the one or more mapping fields, the channel that is between the donor DU and the child node and that is for transmitting the data packet is a first RLC channel.

Optionally, the second configuration information includes a mapping relationship between the one or more respective first mapping value ranges of the one or more mapping fields and an identifier of the first RLC channel.

Optionally, the one or more reference fields include one or more of an IPv4 header field, an IPv6 header field, a source port number, and a destination port number.

Optionally, a field in an IP header of an IPv4 data packet may include one or more fields of a version, a header length, a service type (type of service), a DSCP, a total length, an identifier, a flag, a fragment offset, a time to live, a protocol (that is, a transport layer protocol type), a header checksum, a source IP address, and a destination IP address.

Optionally, a field in an IP header of an IPv6 data packet may include one or more fields of a version, a traffic class (traffic class), a DSCP, a flow label, a payload length, a next header (that is, a transport layer protocol type), a hop limit, a source IP address, and a destination IP address.

Optionally, in the foregoing method, the one or more mapping fields include one or more of a flow label field, a DSCP field, a source IP address field, a destination IP address field, a transport layer protocol type field, a transport layer source port number, and a transport layer destination port number.

According to a second aspect, a configuration method is provided, and the method may be performed by a donor CU or a chip in the donor CU. The method includes:

The donor CU obtains first configuration information, where the first configuration information indicates that one or more respective values of one or more reference fields in a data packet is used to determine one or more mapping fields of the data packet, or a quantity of channels between the donor DU and a child node of the donor DU is used to determine one or more mapping fields of a data packet, or the first configuration information indicates one or more mapping fields of a data packet, and the one or more mapping fields are used to determine a channel that is between the donor DU and the child node and that is for transmitting the data packet.

The donor CU sends the first configuration information to the donor DU.

Optionally, the first configuration information includes a mapping relationship between one or more respective first reference value ranges of the one or more reference fields and one or more first fields.

Optionally, the first configuration information indicates that an output value obtained after performing first operation on respective values of a plurality of reference fields in the data packet is used to determine the one or more mapping fields of the data packet.

Optionally, the first configuration information indicates that when the output value obtained after performing the first operation on the respective values of the plurality of reference fields in the data packet meets a value range of the first operation, the one or more mapping fields of the data packet are the one or more first fields of the data packet.

Optionally, the first configuration information includes a mapping relationship between the value range of the first operation and the one or more first fields. The method further comprises:

The donor CU sends second configuration information to the donor DU, where the second configuration information indicates that one or more values of the one or more mapping fields is used to determine the channel that is between the donor DU and the child node and that is for transmitting the data packet.

Optionally, the second configuration information indicates that when the one or more respective values of the one or more mapping fields meets one or more respective first mapping value ranges of the one or more mapping fields, the channel that is between the donor DU and the child node and that is for transmitting the data packet is a first RLC channel.

Optionally, the second configuration information includes a mapping relationship between the one or more respective first mapping value ranges of the one or more mapping fields and an identifier of the first RLC channel.

Optionally, the one or more reference fields include one or more of an IPv4 header field, an IPv6 header field, a source port number, and a destination port number.

Optionally, a field in an IP header of an IPv4 data packet may include one or more fields of a version, a header length, a service type (type of service), a DSCP, a total length, an identifier, a flag, a fragment offset, a time to live, a protocol (that is, a transport layer protocol type), a header checksum, a source IP address, and a destination IP address.

Optionally, a field in an IP header of an IPv6 data packet may include one or more fields of a version, a traffic class (traffic class), a DSCP, a flow label, a payload length, a next header (that is, a transport layer protocol type), a hop limit, a source IP address, and a destination IP address.

Optionally, the one or more mapping fields include one or more of a flow label field, a DSCP field, a source IP address field, a destination IP address field, a transport layer protocol type field, a transport layer source port number, and a transport layer destination port number.

According to a third aspect, an embodiment of this application provides a configuration method that may be performed by a donor DU or a chip in the donor DU. The method includes:

The donor DU receives first configuration information from a donor CU, where the first configuration information indicates that when one or more respective values of one or more first fields in a data packet correspondingly meets one or more respective first value ranges of the one or more first fields, the data packet is transmitted through a first channel that is between the donor DU and a child node.

The donor DU receives a first data packet.

When one or more respective values of one or more first fields in the first data packet correspondingly meets one or more respective value ranges of the one or more first fields, the data packet is transmitted through a first RLC channel that is between the donor DU and a child IAB node.

The one or more first fields include a DSCP and a flow label, include an IP address and a DSCP, include an IP address and a flow label, include an IP address, a DSCP, and a flow label, or include an IP address, a transport layer protocol type, and a transport layer port number. The transport layer port number includes a transport layer source port number and/or a transport layer destination port number.

Optionally, the first configuration information includes a mapping relationship between the one or more first value ranges of the one or more first fields and an identifier of the first channel.

Optionally, the first configuration information is further used to indicate that when one or more respective values of one or more second fields in the data packet correspondingly meets one or more respective second value ranges of the one or more second fields, the data packet is transmitted through a second channel that is between the donor DU and the child IAB node.

When the one or more respective values of the one or more first fields in the data packet correspondingly meets the one or more respective first value ranges of the one or more first fields, a value of at least one second field of the one or more second fields in the data packet does not meet a second value range of the at least one second field.

When the one or more respective values of the one or more second fields in the data packet correspondingly meets the one or more respective second value ranges of the one or more second fields, a value of at least one first field of the one or more first fields in the data packet does not meet a first value range of the at least one first field.

Optionally, the first configuration information further includes a mapping relationship between the one or more respective second value ranges of the one or more second fields and an identifier of the second channel.

Optionally, the one or more first fields include a part of fields in the one or more second fields. This part of fields may be one or more fields.

Optionally, the one or more first fields do not include any one of the one or more second fields.

Optionally, the mapping relationship includes one or more fields, and the one or more first fields are fields in the mapping relationship that have the first value range.

Optionally, the one or more second fields include one or more fields of a source IP address, a destination IP address, a DSCP, a flow label, a transport layer protocol type, and a transport layer port number.

According to a fourth aspect, an embodiment of this application provides a configuration method that may be performed by a donor CU or a chip in the donor CU. The method includes:

The donor CU obtains first configuration information, where the first configuration information indicates that when one or more respective values of one or more first fields in a data packet correspondingly meets one or more respective first value ranges of the one or more first fields, the data packet is transmitted through a first channel that is between a donor DU and a child node.

The donor CU sends the first configuration information to the donor DU.

The one or more fields include a DSCP and a flow label, include an IP address and a DSCP, include an IP address and a flow label, include an IP address, a DSCP, and a flow label, or include an IP address, a transport layer protocol type, and a transport layer port number. The transport layer port number includes a transport layer source port number and/or a transport layer destination port number.

Optionally, the first configuration information includes a mapping relationship between the one or more respective first value ranges of the one or more first fields and an identifier of the first channel.

Optionally, the first configuration information is further used to indicate that when one or more respective values of one or more second fields in the data packet correspondingly meets one or more respective second value ranges of the one or more second fields, the data packet is transmitted through a second channel that is between the donor DU and a child IAB node.

When the one or more respective values of the one or more first fields in the data packet correspondingly meets the one or more respective first value ranges of the one or more first fields, a value of at least one second field of the one or more second fields in the data packet does not meet a second value range of the at least one second field.

When the one or more respective values of the one or more second fields in the data packet correspondingly meets the one or more respective second value ranges of the one or more second fields, a value of at least one first field of the one or more first fields in the data packet does not meet a first value range of the at least one first field.

Optionally, the first configuration information further includes a mapping relationship between the one or more respective second value ranges of the one or more second fields and an identifier of the second channel.

Optionally, the one or more first fields include a part of fields in the one or more second fields. This part of fields may be one or more fields.

Optionally, the one or more first fields do not include any one of the one or more second fields.

Optionally, the mapping relationship includes one or more fields, and the one or more first fields are fields in the mapping relationship that have the first value range.

Optionally, the one or more second fields include one or more fields of a source IP address, a destination IP address, a DSCP, a flow label, a transport layer protocol type, and a transport layer port number.

According to a fifth aspect, an embodiment of this application provides a configuration method that may be performed by a donor DU or a chip in the donor DU. The method includes:

The donor DU receives first configuration information from a donor CU, where the first configuration information indicates that an output value obtained by performing a first operation on one or more respective values of one or more first fields in a data packet is used to determine a channel that is between the donor DU and a lower child node of the donor DU and that is for transmitting the data packet.

The donor DU receives the data packet.

The donor DU determines, based on the first configuration information, a channel that is between the donor DU and an IAB child node and that is for transmitting the data packet.

Optionally, the first configuration information indicates that when an output value obtained by performing a first operation on respective values of a plurality of first fields in the data packet meets a first value range, the channel for transmitting the data packet is a first channel.

Optionally, the first configuration information includes a mapping relationship between the first value range and an identifier of the first channel.

Optionally, the first configuration information indicates that when the output value obtained by performing the first operation on the one or more respective values of the plurality of first fields in the data packet meets a second value range, the channel for transmitting the data packet is a second channel.

Optionally, the first configuration information includes a mapping relationship between the second value range and an identifier of the second channel.

Optionally, the first configuration information includes a plurality of reference fields.

Optionally, the one or more first fields include one or more of a flow label field, a DSCP field, a source IP address field, a destination IP address field, a transport layer protocol type field, a transport layer source port number, and a transport layer destination port number.

According to a sixth aspect, an embodiment of this application provides a configuration method that may be performed by a donor CU or a chip in the donor CU. The method includes:

The donor CU obtains first configuration information, where the first configuration information indicates that an output value obtained by performing first operation on one or more respective values of one or more first fields in a data packet is used to determine a channel that is between a donor DU and a child node of the donor DU and that is for transmitting the data packet.

The donor DU sends the first configuration information to the donor CU.

Optionally, the first configuration information indicates that when an output value obtained after performing first operation on one or more respective values of a plurality of first fields in the data packet meets a first value range, the channel for transmitting the data packet is a first channel.

Optionally, the first configuration information includes a mapping relationship between the first value range and an identifier of the first channel.

Optionally, the first configuration information indicates that when the output value obtained by performing the first operation on the respective values of the plurality of first fields in the data packet meets a second value range, the channel for transmitting the data packet is a second channel.

Optionally, the first configuration information includes a mapping relationship between the second value range and an identifier of the second channel.

Optionally, the first configuration information includes a plurality of reference fields.

Optionally, the one or more first fields include one or more of a flow label field, a DSCP field, a source IP address field, a destination IP address field, a transport layer protocol type field, a transport layer source port number, and a transport layer destination port number.

Optionally, in the method in the first aspect to the sixth aspect, the channel may be an RLC channel, and the channel may be replaced with an RLC channel, an RLC bearer, or a logical channel.

According to a seventh aspect, an embodiment of this application provides an apparatus. The apparatus provided in this application has a function of implementing the donor CU or the donor DU in the foregoing method aspect, and includes corresponding means (means) configured to perform the steps or the functions described in the foregoing method aspects according to the first aspect to the sixth aspect. The steps or the functions may be implemented by software, hardware, or a combination of hardware and software.

According to an eighth aspect, an embodiment of this application provides a communication apparatus, and the communication apparatus may be a donor DU or a chip in the donor DU. The communication apparatus includes a processor, and the processor is configured to execute a computer program or instructions, so that the communication apparatus is enabled to perform the methods according to the first aspect, the third aspect, and the fifth aspect.

Optionally, the communication apparatus further includes a memory. The processor is coupled to the memory, the memory is configured to store a computer program or instructions, and the processor is configured to execute the computer program or the instructions in the memory.

Optionally, the communication apparatus may further include a communication unit. The communication unit is configured to communicate with another device or another component in the communication apparatus. For example, the communication apparatus is the donor DU, and the communication unit includes an interface between the donor DU and the donor CU. Optionally, the communication unit may further include a transceiver and an antenna of the donor DU. For example, the communication apparatus is the chip in the donor DU, and the communication unit is an input/output circuit or an interface of the chip.

According to a ninth aspect, an embodiment of this application provides a communication apparatus, and the communication apparatus may be a donor CU or a chip in the donor CU. The communication apparatus includes a processor, and the processor is configured to execute a computer program or instructions, so that the communication apparatus is enabled to perform the methods according to the second aspect, the fourth aspect, and the sixth aspect.

Optionally, the communication apparatus further includes a memory. The processor is coupled to the memory, the memory is configured to store a computer program or instructions, and the processor is configured to execute the computer program or the instructions in the memory.

Optionally, the communication apparatus may further include a communication unit. The communication unit is configured to communicate with another device or another component in the communication apparatus. For example, the communication apparatus is the donor CU, and the communication unit is an interface between the donor CU and the donor DU. For example, the communication apparatus is the chip in the donor CU, and the communication unit is an input/output circuit or an interface of the chip.

According to a tenth aspect, an embodiment of this application provides a chip. The chip includes a processor and an interface circuit, and the interface circuit is coupled to the processor. The processor is configured to run a computer program or instructions, to implement the method according to any one of the first aspect to the sixth aspect. The interface circuit is configured to communicate with a module other than the chip.

According to an eleventh aspect, an embodiment of this application provides a computer storage medium. The computer storage medium stores a program used to implement the method according to any one of the first aspect to the sixth aspect. When the program is run in a wireless communication apparatus, the wireless communication apparatus is enabled to perform the method according to any one of the first aspect to the sixth aspect.

According to a twelfth aspect, an embodiment of this application provides a computer program product. The program product includes a program. When the program is run, the method according to any one of the first aspect to the sixth aspect is performed.

According to a thirteenth aspect, an embodiment of this application provides a communication system, including the donor CU (or the chip in the donor CU) in the method according to the first aspect and the donor DU (or the chip in the donor DU) in the method according to the second aspect. Alternatively, the communication system includes the communication apparatus according to the eighth aspect and the communication apparatus according to the ninth aspect.

According to the method in the embodiments of this application, a mapping rule of each data packet may be flexibly set, to ensure that each data packet is mapped to an appropriate RLC channel, thereby meeting a QoS requirement, and improving user experience.

BRIEF DESCRIPTION OF DRAWINGS

To describe technical solutions in embodiments of this application or in the background more clearly, the following describes the accompanying drawings for describing the embodiments of this application or the background.

DESCRIPTION OF EMBODIMENTS

The following describes the embodiments of this application with reference to the accompanying drawings in the embodiments of this application.

Figure 1:
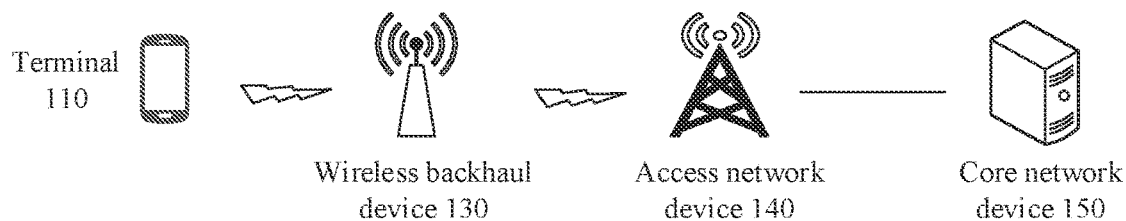
FIG. 1 is an architectural diagram of a mobile communication system 100 according to an embodiment of this application.

FIG. 1 is an architectural diagram of a mobile communication system 100 according to an embodiment of this application. The mobile communication system 100 includes at least one terminal (for example, a terminal 110 and a terminal 120 in FIG. 1), at least one wireless backhaul device (for example, a wireless backhaul device 130 in FIG. 1), at least one access network device (for example, an access network device 140 in FIG. 1), and at least one core network device (for example, a core network device 150 in FIG. 1).

In the foregoing communication system, the terminal is connected to the wireless backhaul device in a wireless manner, and the wireless backhaul device is connected to the access network device in a wireless manner, which may be directly connected to the access network device or indirectly connected to the access network device by using another wireless backhaul device. The access network device may be connected to the core network device in a wired or wireless manner. For example, in FIG. 1, the terminal 110 is connected to the wireless backhaul device 130 in a wireless manner, the wireless backhaul device 130 is directly connected to the access network device 140 or is connected to the access network device 140 by using another wireless backhaul device, and the access network device 140 is connected to the core network device 150 in a wired manner.

The communication system in this embodiment of this application may be a communication system that supports a fourth generation (fourth generation, 4G) access technology, for example, a long term evolution (long term evolution, LTE) access technology. Alternatively, the communication system may be a communication system that supports a fifth generation (fifth generation, 5G) access technology, for example, a new radio (new radio, NR) access technology. Alternatively, the communication system may be a communication system that supports a plurality of wireless technologies, for example, a communication system that supports an LTE technology and an NR technology. In addition, the communication system is also applicable to a future-oriented communication technology.

The terminal (terminal) in this embodiment of this application may be a device that provides voice or data connectivity for a user, and the terminal may be referred to as user equipment (user equipment, UE), a mobile station (mobile station), a subscriber unit (subscriber unit), a station (station), terminal equipment (terminal equipment, TE), and the like. The terminal may be a cellular phone (cellular phone), a personal digital assistant (personal digital assistant, PDA), a wireless modem (modem), a handheld (handheld) device, a laptop computer (laptop computer), a cordless phone (cordless phone), a wireless local loop (wireless local loop, WLL) station, a pad (pad), and the like. With development of wireless communication technologies, any device that can access a wireless communication network, communicate with a wireless network side, or communicate with another object by using a wireless network may be the terminal in the embodiments of this application, for example, a terminal and a vehicle in intelligent transportation, a household device in a smart household, an electricity meter reading instrument or a voltage monitoring instrument in a smart grid, an environment monitoring instrument, a video surveillance instrument in an intelligent security network, or a cash register. The terminal may be statically fixed or removable.

The access network device in the embodiments of this application may be a device on an access network side that is configured to support the terminal in accessing the communication system. The access network device may be referred to as a base station (base station, BS), for example, an evolved NodeB (evolved NodeB, eNB) in a communication system with a 4G access technology, a next generation NodeB (next generation NodeB, gNB) in a communication system with a 5G access technology, a transmission reception point (transmission reception point, TRP), a relay node (relay node), or an access point (access point, AP).

Alternatively, the access network device may be referred to as a donor node, an IAB donor (IAB donor), a donor gNB (DgNB, donor gNB), or the like.

In a possible manner, because a future access network may be implemented by using a cloud radio access network (cloud radio access network, C-RAN) architecture, in a possible manner, a protocol stack architecture and a function of a conventional access network device are divided into two parts. One part is referred to as a centralized unit (centralized unit, CU), and the other part is referred to as a distributed unit (distributed unit, DU). One CU may be connected to one DU, or a plurality of DUs may share one CU. This can reduce costs and facilitate network expansion. The CU and the DU may be divided based on a protocol stack. In a possible manner, a radio resource control (radio resource control, RRC) layer, a service data adaptation protocol (service data adaptation protocol, SDAP) layer, and a packet data convergence protocol (packet data convergence protocol, PDCP) layer are deployed in the CU, and a remaining radio link control (radio link control, RLC) layer, a media access control (media access control, MAC) layer, and a physical layer are deployed in the DU.

The core network device in this embodiment of this application may control one or more access network devices, uniformly manage resources in a system, or may configure a resource for the terminal. For example, the core network device may be a mobility management entity (mobility management entity, MME) or a serving gateway (serving gateway, SGW) in the communication system with the 4G access technology, or an access and mobility management function (Access and Mobility Management Function, AMF) network element or a user plane function (User Plane Function, UPF) network element in the communication system with the 5G access technology.

A wireless backhaul node in the embodiments of this application may be a node that provides a wireless backhaul service, and the wireless backhaul service is a data and/or signaling backhaul service provided through a wireless backhaul link. In one aspect, the wireless backhaul node may provide a wireless access service for the terminal through an access link (access link, AL). In another aspect, the wireless backhaul node may be connected to the access network device through a one-hop or multi-hop backhaul link (backhaul link, BL). Therefore, the wireless backhaul node may implement data and/or signaling forwarding between the terminal and the access network device, thereby expanding a coverage area of the communication system.

The wireless backhaul device may have different names in different communication systems. For example, in a long term evolution (Long Term Evolution, LTE) system or an LTE-A system, the wireless backhaul device may be referred to as a relay node (relay node, RN). In a fifth generation (5th generation, 5G) mobile communication technology system, the wireless backhaul device may be referred to as an integrated access backhaul node (integrated access and backhaul node, IAB node). Certainly, in other communication systems, the wireless backhaul device may also have different names, and this is not limited herein.

Figure 2:
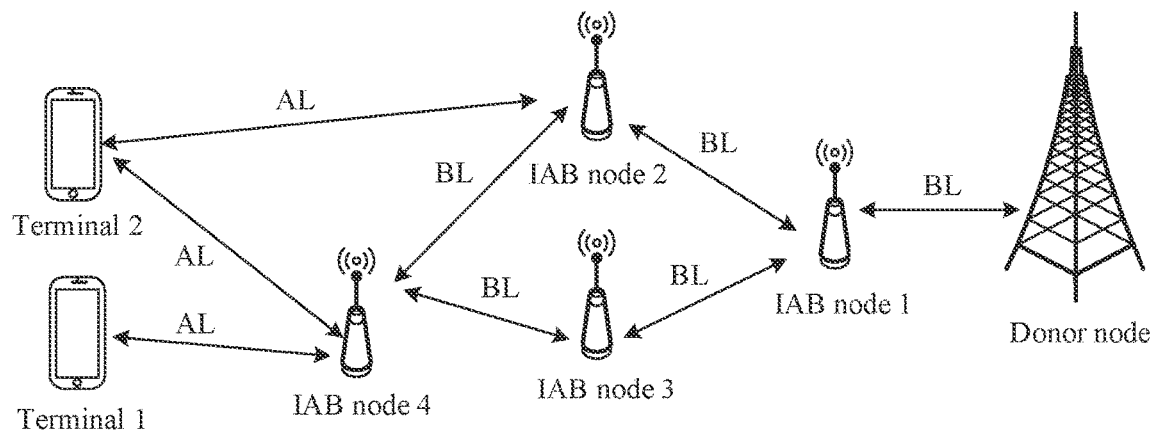
FIG. 2 is an architectural diagram of an IAB network 200 according to an embodiment of this application.

FIG. 2 is an architectural diagram of an IAB network 200 according to an embodiment of this application. The following further describes the terminal, the wireless backhaul device, and the access network device in FIG. 1 with reference to FIG. 2.

In FIG. 2, a terminal 1 or a terminal 2 may correspond to the terminal 110 in FIG. 1. An IAB node 1, an IAB node 2, an IAB node 3, and an IAB node 4 correspond to the wireless backhaul device 130 shown in FIG. 1. A donor node may correspond to the access network device 140 in FIG. 1. The donor node may be connected to the core network device 150 in FIG. 1 in a wired manner. The donor node may be referred to as an IAB donor (IAB donor) or a DgNB (namely, a donor gNodeB) for short.

As shown in FIG. 2, in the IAB network 200, the terminal may be connected to one or more IAB nodes in a wireless manner, the one or more IAB nodes may be connected to each other in a wireless manner, and the one or more IAB nodes may be connected to the donor node in a wireless manner. A link between the terminal and the IAB node may be referred to as an access link, and a link between the IAB nodes and a link between the IAB node and the donor node may be referred to as a backhaul link.

To ensure service transmission reliability, the IAB network supports multi-hop IAB node networking and multi-connectivity IAB node networking. Therefore, there may be a plurality of transmission paths between the terminal and the donor node. On one path, there is a determined hierarchical relationship between the IAB nodes, and between the IAB node and a donor node serving the IAB node. Each IAB node considers, as a parent node, a node providing a backhaul service for the IAB node. Correspondingly, the IAB node may be considered as a child node of the parent node of the IAB node.

For example, refer to FIG. 2. A parent node of the IAB node 1 is a donor node, the IAB node 1 is a parent node of the IAB node 2 and the IAB node 3, and both the IAB node 2 and the IAB node 3 are parent nodes of the IAB node 4. An uplink data packet of the terminal may be transmitted to the donor node through one or more IAB nodes, and then is sent by the donor node to a mobile gateway device (for example, a user plane function (user plane function, UPF for short) network element in a 5G network). After the donor node receives a downlink data packet from the mobile gateway device, the donor node sends the downlink data packet to the terminal through the one or more IAB nodes. There are two available paths for data packet transmission between a terminal 1 and the donor node: the terminal 1→the IAB node 4→the IAB node 3→the IAB node 1→the donor node, and the terminal 1→the IAB node 4→the IAB node 2→the IAB node 1→the donor node. There are three available paths for data packet transmission between a terminal 2 and the donor node: the terminal 2→the IAB node 4→the IAB node 3→the IAB node 1→the donor node, the terminal 2→the IAB node 4→the IAB node 2→the IAB node 1→the donor node, and the terminal 2→the IAB node 2→the IAB node 1→the donor node.

It may be understood that, in the IAB network, one transmission path between the terminal and the donor node may include one or more IAB nodes. Each IAB node needs to maintain a wireless backhaul link to a parent node, and further needs to maintain a wireless link to a child node. If one IAB node is a node accessed by the terminal, a radio access link exists between the IAB node and a child node (namely, the terminal). If one IAB node is a node that provides a backhaul service for another IAB node, a wireless backhaul link exists between the IAB node and a child node (namely, the another IAB node). For example, refer to FIG. 2. In the path "the terminal 1→the IAB node 4→the IAB node 3→the IAB node 1→the donor node", the terminal 1 accesses the IAB node 4 through a wireless access link, the IAB node 4 accesses the IAB node 3 through a wireless backhaul link, the IAB node 3 accesses the IAB node 1 through a wireless backhaul link, and the IAB node 1 accesses the donor node through a wireless backhaul link.

The foregoing IAB network is merely an example. In an IAB network with multi-hop and multi-connectivity combined, there are more other possibilities in the IAB network. For example, a donor node and an IAB node connected to another donor node form dual connectivity to serve a terminal. The possibilities are not listed one by one herein.

Figure 3:
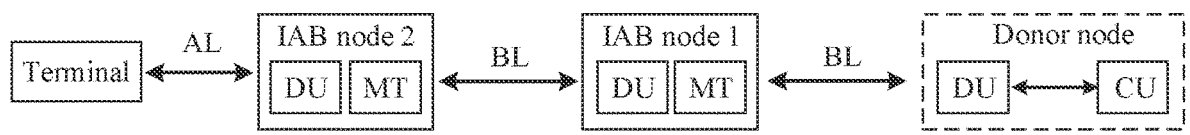
FIG. 3 is an architectural diagram of an IAB network 300 according to an embodiment of this application.

FIG. 3 is an architectural diagram of an IAB network 300 according to an embodiment of this application. The following further describes the IAB node and the donor node in FIG. 2 with reference to FIG. 3.

In the IAB network, the donor node may be in a form in which a centralized unit (centralized unit, CU for short) (which may be referred to as a donor CU, Donor-CU) and a distributed unit (distributed unit, DU for short) (which may be referred to as a donor DU, Donor-DU) are separated.

The donor-CU may be in a form in which a user plane (User plane, UP for short) (which is referred to as a CU-UP for short in this specification) and a control plane (Control plane, CP for short) (which is referred to as a CU-CP for short in this specification) are separated, that is, the donor-CU includes the CU-CP and the CU-UP.

In the IAB network, when the IAB node serves as a parent node, the IAB node may act as a role similar to an access network device, and allocate, to a child node of the IAB node by scheduling on an available air interface resource managed by a donor base station, an uplink resource used for uplink data transmission. When the IAB node serves as a child node, for a parent node serving the IAB node, the IAB node may serve as a terminal device, access a wireless network like the terminal device, and perform a function of the terminal device. The IAB node establishes a connection to the parent node by performing operations such as cell selection and random access, to obtain an uplink resource that is scheduled by the parent node for the IAB node and that is used for uplink data transmission. By way of example and not limitation, in this embodiment of this application, a part of the IAB node that performs a function of a terminal device is referred to as a mobile terminal (mobile terminal, MT) side of the IAB node or an MT function unit of the IAB node. A part of the IAB node that functions as an access network device similar to a base station is referred to as a DU side of the IAB node or a DU function unit of the IAB node. The MT function unit and the DU function unit may be merely logical division and are integrated into the IAB node. Alternatively, the MT function unit and the DU function unit may be different physical devices.

As shown in FIG. 3, the donor node includes the donor-CU and the donor-DU. An IAB node 1 includes an MT side of the IAB node 1 and a DU side of the IAB node 1. An IAB node 2 includes an MT side of the IAB node 2 and a DU side of the IAB node 2.

As shown in FIG. 3, in a downlink direction, the donor CU may send a data packet to the donor DU, or an operation, administration and maintenance (operation, administration and maintenance, OAM) server may send a data packet to the donor DU (not shown in FIG. 3). The donor DU sends the data packet to the IAB node 1 through a BL link, and then the IAB node 1 sends the data packet to the IAB node 2 through a BL link. Finally, the IAB node 2 sends the data packet to a terminal through an AL link.

In an uplink direction, a terminal may send a data packet to the IAB node 2 through an AL link, the IAB node 2 sends the data packet to the IAB node 1 through a BL link, and the IAB node 1 sends the data packet to the donor DU through a BL link. Finally, the donor DU sends the data packet to the donor CU, or the donor DU sends the data packet to the OAM server (not shown in FIG. 3).

Figure 4:
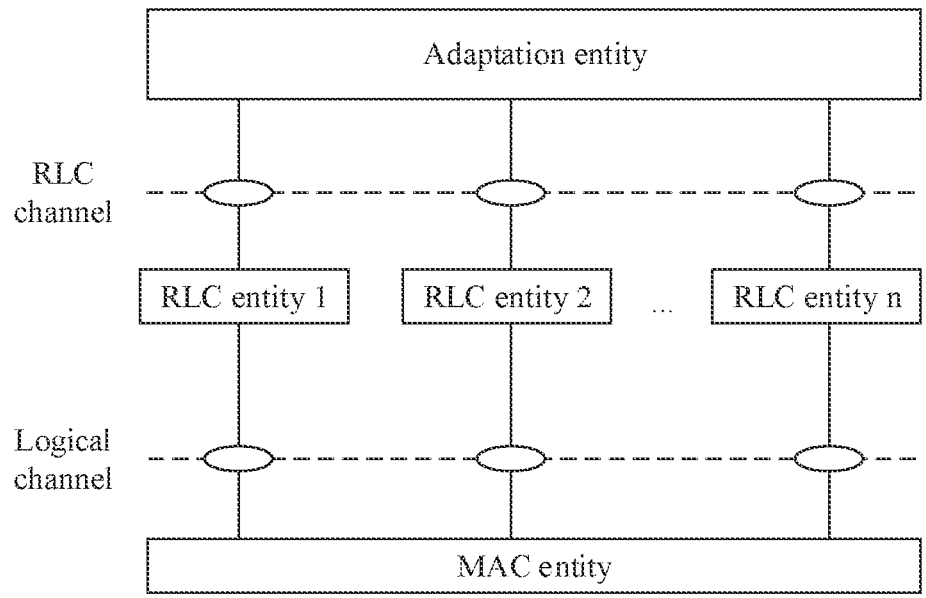
FIG. 4 is a schematic diagram of a mapping relationship among an RLC channel, a logical channel, and a protocol entity according to an embodiment of this application.
Figure 5:
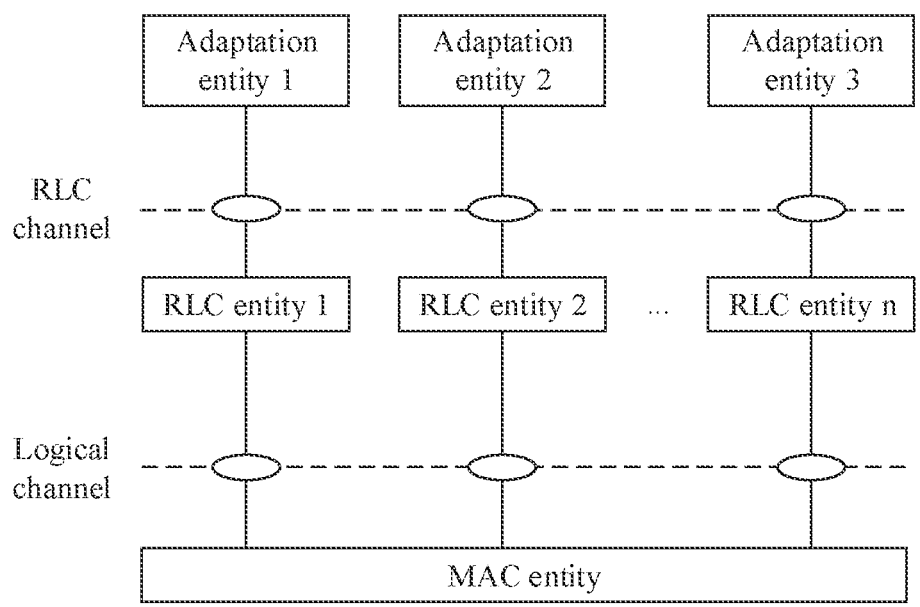
FIG. 5 is a schematic diagram of another mapping relationship among an RLC channel, a logical channel, and a protocol entity according to an embodiment of this application.

Refer to FIG. 4 and FIG. 5. FIG. 4 and FIG. 5 are schematic diagrams of a mapping relationship among an RLC channel, a logical channel (logical channel, LCH), and a protocol entity. As shown in FIG. 4 or FIG. 5, the RLC channel (channel) is a channel between an RLC entity and an upper-layer protocol entity of the RLC entity. For example, if an upper layer of the RLC entity is a PDCP entity, an RLC channel on a backhaul link is a channel between the RLC entity and the PDCP entity. For another example, if an upper layer of the RLC entity is an adaptation, which is also referred to as a backhaul adaptation protocol (Backhaul Adaptation Protocol, BAP) layer entity, an RLC channel on a backhaul link is a channel between the RLC entity and the BAP entity. Therefore, a definition of the RLC channel specifically depends on the upper-layer protocol entity of the RLC entity.

The logical channel is a channel between the RLC entity and a lower-layer protocol entity of the RLC entity. For example, a lower layer of the RLC entity is a MAC layer, and the logical channel is a channel between the RLC entity and a MAC entity.

An RLC channel of an IAB node is in a one-to-one correspondence with an RLC entity and an RLC bearer.

A relationship between the BAP entity and the RLC entity may be that one BAP entity corresponds to a plurality of RLC entities, as shown in FIG. 4, or may be that one BAP entity corresponds to one RLC entity, as shown in FIG. 5. This is not limited in this application.

In addition, a BAP layer has one or more of the following capabilities: adding, to a data packet, routing information (routing information) that can be identified by a wireless backhaul node (IAB node), performing route selection based on the routing information that can be identified by the wireless backhaul node, adding, to the data packet, identification information that is related to a quality of service (quality of service, QoS) requirement and that can be identified by the wireless backhaul node, performing, for the data packet, QoS mapping on a plurality of links including the wireless backhaul node, adding data packet type indication information to the data packet, and sending flow control feedback information to a node that has a flow control capability. It should be noted that a name of a protocol layer having these capabilities is not necessarily the BAP layer, and may also have another name. A person skilled in the art may understand that any protocol layer having these capabilities may be understood as the BAP layer in this embodiment of this application. An RLC channel on a BH link may be understood as a service differentiation channel on a BH link between two nodes, and the service differentiation channel may ensure specific quality of service QoS for data packet transmission. The RLC channel on the BH link may be understood as a logical concept rather than a concept of physical channel.

Specifically, the RLC channels on the BH link may be understood as peer RLC channels of two IAB nodes on the BH link. For example, in FIG. 3, the donor DU has an RLC channel 1 and an RLC channel 2. The IAB node 1 has an RLC channel 1 and an RLC channel 2. An RLC entity of the RLC channel 1 of the donor DU and an RLC entity of the RLC channel 1 of the IAB node 1 are peer (peer) RLC entities. An RLC entity of the RLC channel 2 of the donor DU and the RLC entity of the RLC channel 2 of the IAB node 1 are peer (peer) RLC entities. It may be further understood that the RLC channel 1 of the donor DU and the RLC channel 1 of the IAB node 1 are peers, and the RLC channel 2 of the donor DU and the RLC channel 2 of the IAB node 1 are peers. An RLC channel 1 on a BH link between the donor node DU and the IAB node 1 may be the RLC channel 1 of the donor DU and the RLC channel 1 of the IAB node 1. An RLC channel 2 on the BH link between the donor node DU and the IAB node 1 may be the RLC channel 2 of the donor DU and the RLC channel 2 of the IAB node 1.

Because the RLC channel, the RLC bearer, and the logical channel are in a one-to-one correspondence, in this embodiment of this application, the three terms may be replaced with each other. For example, in this embodiment of this application, the RLC channel may be replaced with the RLC bearer or the logical channel. Similarly, an RLC bearer on a BH link may also be referred to as a BH bearer or a BH link bearer. Therefore, an RLC channel on the BH link may be replaced with the RLC bearer on the BH link, a logical channel on the BH link, the BH bearer, or the BH link bearer.

To make the embodiments of this application clearer, the following collectively describes some content and concepts related to the embodiments of this application.

(1) Access IAB node and intermediate IAB node

In the embodiments of this application, the access IAB node is an IAB node accessed by a terminal, and the intermediate IAB node is an IAB node that provides a wireless backhaul service for another IAB node (for example, an access IAB node or another intermediate IAB node).

For example, refer to FIG. 2. In the path "the terminal 1→the IAB node 4→the IAB node 3→the IAB node 1→the donor node", the IAB node 4 is an access IAB node, and the IAB node 3 and the IAB node 1 are intermediate IAB nodes. The IAB node 3 provides a backhaul service for the IAB node 4, and the IAB node 1 provides a backhaul service for the IAB node 3.

It should be noted that, an IAB node is an access IAB node for a terminal that accesses the IAB node. For a terminal that accesses another IAB node, the IAB node is an intermediate IAB node. Therefore, whether an IAB node is an access IAB node or an intermediate IAB node is not fixed, and needs to be determined based on a specific application scenario.

(2) Link, access link, and backhaul link

The link is a path between two neighboring nodes on a path.

The access link is a link accessed by a terminal, or may be a link between a terminal and an access network device, between a terminal and an IAB node, between a terminal and a donor node, or between a terminal and a donor DU. Alternatively, the access link includes a wireless link used when an IAB node serves as a common terminal device to communicate with a parent node of the IAB node. When serving as the common terminal device, the IAB node does not provide a backhaul service for any child node. The access link includes an uplink access link and a downlink access link. In this application, an access link of a terminal is a wireless link. Therefore, the access link may also be referred to as a wireless access link.

The backhaul link is a link between an IAB node and a parent node when the IAB node serves as a wireless backhaul node. When serving as the wireless backhaul node, the IAB node provides a wireless backhaul service for a child node. The backhaul link includes an uplink backhaul link and a downlink backhaul link. In this application, the backhaul link between the IAB node and the parent node is a wireless link. Therefore, the backhaul link may also be referred to as a wireless backhaul link.

(3) Previous-hop node of a node, next-hop node of the node, ingress link (ingress link) of the node, and egress link (egress link) of the node The previous-hop node of the node is the last node that is on a path including the node and that receives a data packet before the node.

The next-hop node of the node is the $1^{st}$ node that is on a path including the node and that receives a data packet after the node.

The ingress link of the node is a link between the node and a previous-hop node of the node, and may also be referred to as a previous-hop link of the node.

The egress link of the node is a link between the node and a next-hop node of the node, and may also be referred to as a next-hop link of the node.

(4) Parent node and child node: Each IAB node considers a node that provides a wireless access service and/or a wireless backhaul service for the IAB node as a parent node (parent node). Correspondingly, the IAB node may be considered as a child node (child node) of the parent node of the IAB node. Alternatively, the child node may also be referred to as a lower-level node, and the parent node may also be referred to as an upper-level node.

(5) Data packet

The data packet may be a data packet in a radio bearer (RB, radio bearer). The RB may be a data radio bearer (data radio bearer, DRB). It may be understood that the data packet is a user plane data packet, or may be a signaling radio bearer (signaling radio bearer, SRB). It may be understood that the data packet is a control plane data packet. Alternatively, the data packet may be an operation, administration and maintenance (operation, administration and maintenance, OAM) data packet. It may be understood that the data packet is a management plane data packet.

(6) Transmission (transmission or transmit) may be understood as sending (send) and/or receiving (receive). For example, a data packet is transmitted through an RLC channel between a donor DU and a next-hop IAB node. For the donor DU, the data packet is sent through the RLC channel to the next-hop IAB node. For the next-hop IAB node, the data packet is received from the donor DU through the RLC channel.

(7) Value range: In the embodiments of this application, the value range may be a range of values or a value, and the range of values may include a plurality of consecutive or discrete values. The value range may be referred to as a value span. When a left range and a right range of the value range are equal, the value range includes only one value; and when a left range and a right range of the value range are not equal, the value range includes all values falling into the value range. Alternatively, the value range may be referred to as a value list, and the value list may include one value or a plurality of consecutive or discrete values.

(8) In the embodiments of this application, "a plurality of" means two or more. In view of this, in the embodiments of this application, "a plurality of" may also be understood as "at least two". "At least one" may be understood as one or more, for example, understood as one, two, or more. For example, "include at least one" means "include one, two, or more", and there is no limitation on which is included. For example, "include at least one of A, B, and C" may mean "include A, B, or C", "include A and B", "include A and C", "include B and C", or "include A, B, and C". The term "and/or" describes an association relationship between associated objects and represents that three relationships may exist. For example, A and/or B may represent the following three cases: Only A exists, both A and B exist, and only B exists. In addition, the character "/" generally represents an "or" relationship between the associated objects, unless otherwise specified. The terms "system" and "network" may be used interchangeably in the embodiments of this application. Unless otherwise specified, ordinal terms such as "first" and "second" mentioned in the embodiments of this application are used to distinguish a plurality of objects, but are not used to limit an order, a time sequence, a priority, or an importance degree among the plurality of objects.

In the communication scenario or the communication network in FIG. 1 to FIG. 3, to meet QoS requirements of different data packets, different RLC channels may be established between on wireless backhaul links, and different data packets may be mapped to different RLC channels for transmission. For example, there are two manners of mapping a data packet to an RLC channel. One manner is one-to-one mapping, that is, a data packet in an RB is uniquely mapped to an RLC channel, and the RLC channel is used to transmit only the data packet in the RB. For a radio bearer of some UEs such as an RB having a relatively high QoS requirement (where a QoS requirement may include as a delay, a bandwidth, reliability, or the like), the one-to-one mapping manner may be considered, to ensure data packet transmission performance. The other manner is many-to-one mapping, that is, data packets in a plurality of RBs (which may belong to a same UE or may belong to different UEs) are mapped to one RLC channel, and the RLC channel is used to transmit the data packets in the plurality of RBs. For radio bearers of other UEs, for example, RBs having low QoS requirements, the many-to-one mapping manner may be considered. In this way, the data packets of the plurality of RBs share one RLC channel, so that an IAB network can serve a plurality of users without extending to support a large quantity of RLC channels.

However, a large quantity of data packets may need to be transmitted in the IAB network, and there are a plurality of RLC channels between a donor DU and a child node of the donor DU (that is, a next-hop node to which the donor DU performs downlink transmission, for example, as shown in FIG. 3, the child node of the donor DU is the IAB node 1). When receiving a downlink data packet, the donor DU may fail to determine an RLC channel to which a data packet is to be mapped for transmission. As a result, the data packet is not mapped to an appropriate RLC channel for transmission, a QoS requirement of the data packet cannot be ensured, and user experience is greatly reduced.

To ensure that the donor DU can map the data packet to an appropriate RLC channel for transmission, the embodiments of this application provide a method. Because a donor CU can obtain a downlink transmission status of the entire IAB network, the donor CU may configure a mapping rule of the data packet in advance, and then send the mapping rule to the donor DU. The donor DU maps, based on the mapping rule, a subsequently received data packet to a corresponding RLC channel for transmission. The method is applicable to both the one-to-one mapping manner and the many-to-one mapping manner. For the mapping rule, the embodiments of this application provide the following solutions.

Solution 1: An RLC channel to which a data packet is to be mapped may be determined based on one or more values of one or more fields in the data packet. For example, the donor CU may indicate the donor DU to map the data packet to a specific RLC channel when the one or more values of the one or more fields meets a specific condition. The data packet may be mapped to an appropriate RLC channel by using an existing field in the data packet. When a QoS requirement of the data packet is met, no additional information exchange between the donor CU and the donor DU is required, thereby saving communication resources.

Solution 2: When a large quantity of data packets of different service types need to be transmitted in the IAB network, a mapping rule of the data packet may be relatively complex, and a requirement of configuring mapping rules of the large quantity of data packets may not be flexibly met based only on one or more values of one or more fields. In this case, it may be considered that different data packets use different fields to determine an RLC channel to be mapped. For example, an RLC channel to which a data packet 1 is to be mapped may be determined based on a field 1 and a field 2 in the data packet 1. An RLC channel to which a data packet 2 is to be mapped may be determined based on a field 3 and a field 4 in the data packet 2, and the field 1, the field 2, the field 3, and the field 4 are different from each other.

However, in this case, after receiving one data packet, the donor DU may fail to determine fields in the data packet to be used to perform RLC channel mapping. Therefore, in solution 2, two mapping processes may be set. In the $1^{st}$ mapping process, one or more mapping fields are first determined based on one or more values of one or more fields (where these fields are referred to as reference fields below for ease of description) in the data packet. In the $2^{nd}$ mapping process, the RLC channel is determined based on one or more values of the one or more mapping fields.

In this manner, the mapping rules of the data packets may be flexibly set, to ensure that the data packets are mapped to appropriate RLC channels, and a QoS requirement is met. In addition, an existing field in the data packet is used in the two mapping processes. Therefore, no additional information exchange between the donor CU and the donor DU is caused, thereby saving communication resources.

The following describes solution 1 and solution 2 with reference to specific accompanying drawings.

Solution 1

Figure 6:
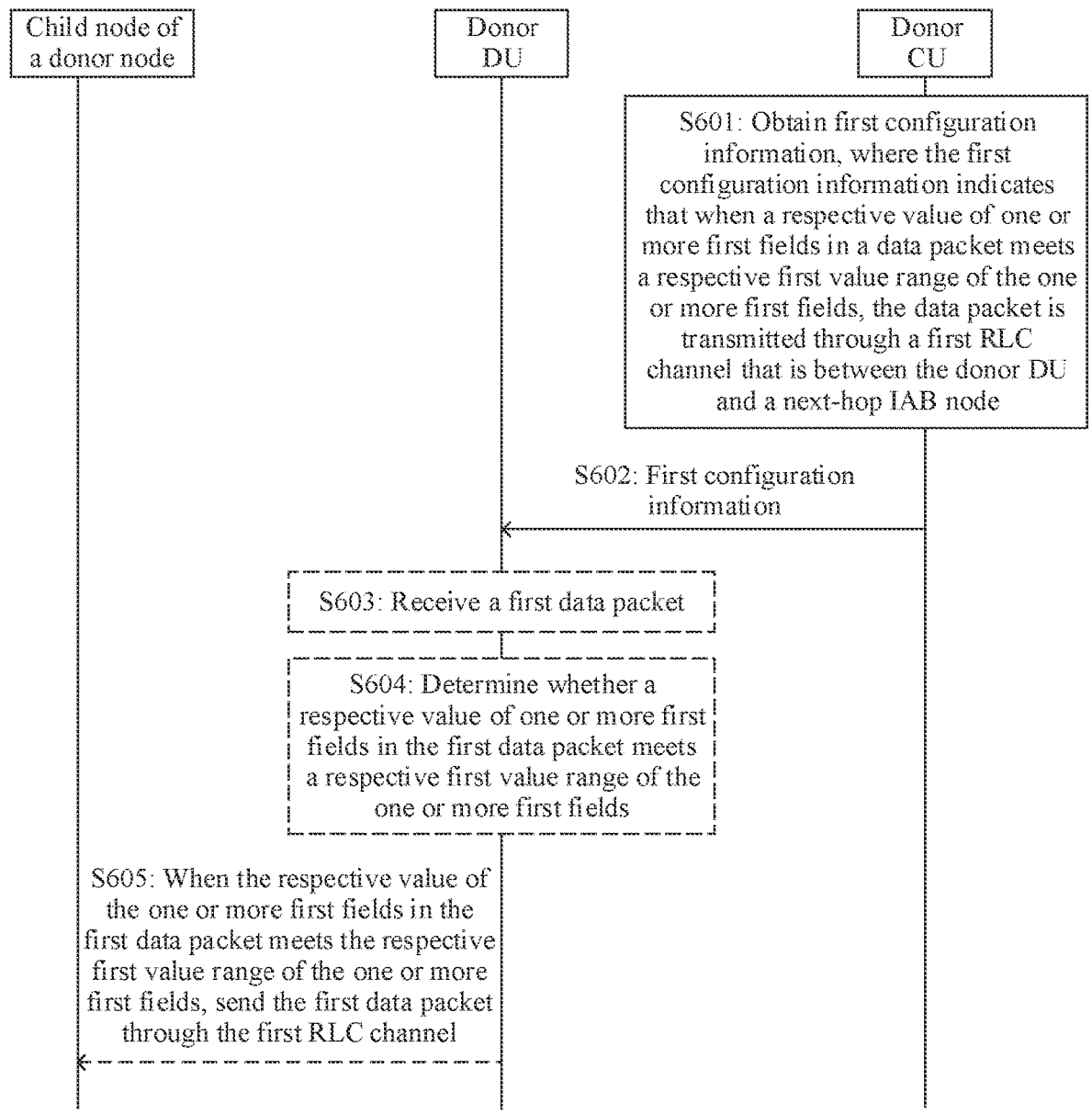
FIG. 6 is a schematic diagram of a configuration method according to an embodiment of this application.

FIG. 6 is a schematic diagram of a configuration method according to an embodiment of this application. As shown in FIG. 6, the method in FIG. 6 includes the following steps.

S601: A donor CU obtains first configuration information, where the first configuration information indicates that when one or more respective values of one or more first fields in a data packet meets one or more respective first value ranges of the one or more first fields, the data packet is transmitted through a first RLC channel that is between a donor DU and a child node of the donor DU. Optionally, the data packet is a downlink data packet, and may be any data packet that may be received by the donor DU but not a specific data packet received by the donor DU. The first configuration information may not carry an identifier of the data packet. In other words, after receiving the data packet, the donor DU may determine, based on the first configuration information, an RLC channel for transmitting the data packet.

S602: The donor CU sends the first configuration information to the donor DU.

Optionally, the first configuration information may be carried in an F1 application protocol (F1 application protocol, F1AP) message sent by the donor CU to the donor DU.

Optionally, after receiving the first configuration information, the donor DU may store the first configuration information.

S603: The donor DU receives a first data packet.

S604: The donor DU determines whether one or more respective values of one or more first fields in the first data packet meets one or more respective first value ranges of the one or more first fields.

S605: When the one or more respective values of the one or more first fields in the first data packet meets the one or more respective first value ranges of the one or more first fields, the donor DU sends the first data packet to the child node of the donor DU through the first RLC channel.

For example, refer to FIG. 3. The child node of the donor DU is the IAB node 1.

S603 to S605 are optional.

According to the method in FIG. 6, each first field has a value and a first value range. When the value of each first field meets the first value range of the first field, the data packet is transmitted through the first RLC channel.

Optionally, the first value range of each first field may include one value, or include a plurality of consecutive or discrete values.

For example, in the first configuration information, a plurality of first fields include a field 1 and a field 2, a value range of the field 1 is A1 to A2, and a value range of the field 2 is B1 to B2. In the first data packet received by the donor DU, a value of the field 1 is a, and a value of the field 2 is b. When the value a falls within the value range of A1 to A2, and the value b falls within the value range of B1 to B2, the donor DU transmits the first data packet through the first RLC channel.

Optionally, the first configuration information may include a mapping relationship between the one or more respective first value ranges of the one or more first fields and an identifier of the first RLC channel. For example, the first configuration information includes a mapping relationship between the value range of A1 to A2 of the field 1 and the identifier of the first RLC channel, and a mapping relationship between the value range of B1 to B2 of the field 2 and the identifier of the first RLC channel.

Optionally, the first configuration information may further include the one or more first fields. In other words, the first configuration information includes the one or more first fields, the first value range of each first field, and the identifier of the first RLC channel. Optionally, in this case, the first configuration information may include one or more fields, where the one or more first fields are fields that have the first value ranges in the one or more fields. A field other than the one or more first fields in the one or more fields does not have the first value range, or the first value range is null.

Optionally, the first configuration information may not include the one or more first fields, and the donor DU and the donor CU may preconfigure the one or more first fields.

The preconfiguration in the embodiments of this application may be understood as writing into the donor DU and/or the donor CU in a static manner. For example, the one or more first fields are written into the donor DU and/or the donor CU when the donor DU and/or the donor CU are/is delivered. Alternatively, the preconfiguration may be understood as that the donor CU may indicate the one or more first fields to the donor DU by using configuration information other than the first configuration information. A concept of preconfiguration is not described in detail below again.

In the foregoing first implementation, the first configuration information may further indicate that when one or more respective values of one or more second fields in the data packet meets one or more respective second value ranges of the one or more second fields, the data packet is transmitted through a second RLC channel that is between the donor DU and the child node of the donor DU.

Similarly, each second field has a value and a second value range, and the value of each second field needs to meet the second value range of the second field.

For example, in the first configuration information, a plurality of second fields include a field 1 and a field 3, a value range of the field 1 is A3 to A4, and a value range of the field 3 is C1 to C2. In the first data packet received by the donor DU, a value of the field 1 is a, and a value of the field 3 is c. When the value a falls within the value range of A3 to A4, and the value c falls within the value range of C1 to C2, the donor DU transmits the first data packet through the second RLC channel.

Optionally, the first configuration information may include a mapping relationship between the one or more respective second value ranges of the one or more second fields and the second RLC channel. For example, the first configuration information includes a mapping relationship between the value range of A3 to A4 of the field 1 and the identifier of the second RLC channel, and a mapping relationship between the value range of C1 to C2 of the field 3 and the identifier of the second RLC channel.

Optionally, the first configuration information may include the one or more second fields or may not include the one or more second fields, and the donor DU and the donor CU may preconfigure the one or more second fields. For details, refer to content of the one or more first fields. Details are not described herein again.

Table 1 is a schematic table of the first configuration information in this embodiment of this application. It should be noted that Table 1 is merely an example, and the first configuration information may be carried in another manner. This is not limited in this embodiment of this application. In addition, all tables in the embodiments of this application are merely examples, and configuration information may be carried in another manner. Details are not described below.

It is assumed that there are N fields in total in a data packet. As shown in the $1^{st}$ row in Table 1, there are a field 1, a field 2, a field 3, . . . , and a field N, where N is an integer greater than or equal to 1. The one or more first fields may be some or all of the N fields, for example, the field 1 and the field 2 in Table 1, and the first configuration information indicates that when a value of the field 1 in the data packet meets a first reference value range (for example, A1 to A2) of the field 1, and a value of the field 2 in the data packet meets a first reference value range (for example, B1 to B2) of the field 2, the data packet is transmitted through the first RLC channel. The first configuration information may include the field 1, the field 2, . . . , and the field N, the first reference value range of the field 1, the first reference value range of the field 2, and the identifier of the first RLC channel. Reference value ranges of the field 3, . . . , and the field N are null (NULL). In this embodiment of this application, that a reference value range is NULL may be understood as that the reference value range is N/A, is not applicable (not applicable), or the like.

The one or more second fields may be some or all of the N fields, for example, the field 1 and the field 3 in Table 1, and the first configuration information indicates that when a value of the field 1 in the data packet meets a second reference value range (for example, A3 to A4) of the field 1, and a value of the field 3 in the data packet meets a second reference value range (for example, C1 to C2) of the field 3, the data packet is transmitted through the second RLC channel. The first configuration information may include the field 1, the field 2, . . . , and the field N, the second reference value range of the field 1, the second reference value range of the field 3, and the identifier of the second RLC channel. Reference value ranges of the field 2, the field 4, . . . , and the field N are null (NULL).

By analogy, one or more $K^{th}$ fields may be some or all of the N fields. When one or more respective values of the one or more $K^{th}$ fields in the data packet correspondingly meets one or more respective value ranges of the one or more $K^{th}$ fields, the data packet is transmitted through a $K^{th}$ RLC channel, where K is an integer greater than or equal to 1. The first configuration information may include the field 1, the field 2, . . . , and the field N, the one or more respective value ranges of the one or more $K^{th}$ fields, and an identifier of the $K^{th}$ RLC channel. A reference value range of afield other than the one or more $K^{th}$ fields is null (NULL).

TABLE 1

| Field 1 | Field 2 | Field 3 | ... | Field N | RLC channel |
|---|---|---|---|---|---|
| First reference value range (for example, A1 to A2) | First reference value range (for example, B1 to B2) | NULL | ... | NULL | First RLC channel |
| Second reference value range (for example, A3 to A4) | NULL | Second reference value range (for example, C1 to C2) | ... | NULL | Second RLC channel |
| ... | ... | ... | ... ... | ... | ... |
| $K^{th}$ reference value range | $K^{th}$ reference value range | NULL | ... | $K^{th}$ reference value range | $K^{th}$ RLC Channel |

Optionally, one data packet can only meet the one or more respective first value ranges of the one or more first fields, or the one or more respective second value ranges of the one or more second fields. That is, the data packet cannot meet both the one or more first value range of the one or more first fields and the one or more second value range of the one or more second fields. Refer to Table 1. The data packet can meet only one row in Table 1, but cannot meet two rows, three rows, or more rows in Table 1.

In other words, when the one or more respective value of the one or more first fields in the data packet correspondingly meets the one or more respective first value range of the one or more first fields, a value of at least one second field of the one or more second fields in the data packet does not meet a second value range of the at least one second field. When the one or more respective value of the one or more second fields in the data packet correspondingly meets the one or more respective second value ranges of the one or more second fields, a value of at least one first field of the one or more first fields in the data packet does not meet a first value range of the at least one first field.

The data packet can meet only one of the one or more respective first value ranges of the one or more first fields and the one or more respective second value ranges of the one or more second fields. In this way, it can be ensured that the donor DU may uniquely determine that an RLC channel used to transmit the data packet is the first RLC channel or the second RLC channel, to map the data packet to an appropriate RLC channel for transmission. This can avoid that when the data packet meets both the foregoing two conditions, the donor DU fails to determine whether the data packet is transmitted through the first RLC channel or the data packet is transmitted through the second RLC channel. As a result, an appropriate RLC channel is not selected for transmitting the data packet.

The terms "first" and "second" in the one or more first fields and the one or more second fields are only used for identification but are not intended to constitute a limitation, and the terms "first" and "second" may be interchanged.

Optionally, there may be an overlapping field (where the overlapping field may be understood as a same field) between the one or more first fields and the one or more second fields. That is, the one or more first fields may include some fields (which may be one or more fields) in the one or more second fields. For example, a field that is overlapped with another field is referred to as an overlapping field. A first value range of the overlapping field and a second value range of the overlapping field may be the same or different.

For example, the one or more first fields may be partially the same as the one or more second fields.

For example, the one or more first fields may be completely the same as the one or more second fields. In this case, it can be ensured that the first value range of the at least one overlapping field is different from the second value range of the overlapping field, as long as the data packet does not meet two rows in Table 1.

Optionally, the one or more first fields and the one or more second fields may be nonoverlapping (where nonoverlapping may be understood as being different). That is, the one or more first fields do not include any one of the one or more second fields.

Optionally, the one or more first fields and the one or more second fields may be any one or more fields carried in a downlink data packet in an IAB network, for example, one or more fields in various protocol layer data headers of the downlink data packet in the IAB network. This is not limited in this embodiment of this application.

Optionally, the one or more first fields may include one or more of seven fields that are a source Internet Protocol (Internet protocol, IP) address (which may alternatively be expressed as a source IP address), a destination IP address (which may alternatively be expressed as a destination IP address), a differentiated services code point (differentiated services code point, DSCP), a flow label (flow label), a transport layer protocol type, a transport layer source port number, and a transport layer destination port number. It may be understood that the one or more first fields may be any one of or a combination of any n fields of the foregoing seven fields (where n is a positive integer greater than 1 and less than or equal to 7).

Optionally, the flow label may be used to distinguish data packets of different RBs of UEs of an IAB node served by the donor DU. The DSCP may be used to distinguish data packets of different RBs of UE of the IAB node served by the donor DU. An IP address may be used to distinguish data packets of some special types of services in the IAB network, for example, a data packet of an OAM service. The transport layer protocol type and a transport layer port number may be used to distinguish data packets of some special types of services, for example, the data packet of the OAM service (the TCP is used at a transport layer), an interactive data packet related to the stream control transmission protocol (stream control transmission protocol, SCTP), such as a handshake packet or an SCTP heartbeat packet used when an SCTP association (association) is established between the IAB node and the donor CU. A combination of one or more fields may be selected based on a status in the IAB network, so that a mapping rule can be flexibly formulated for a data packet that may be received by the donor DU, to map the data packet to an appropriate RLC channel, thereby ensuring QoS requirements of different data packets.

For example, the one or more first fields may be the IP address (the source IP address or the destination IP address, where this is similar for the following descriptions, and details are not described herein), the DSCP, the flow label, the transport layer protocol type, the transport layer port number, the flow label+the DSCP, the IP address+the flow label, the IP address+the DSCP, the IP address+the flow label+the DSCP, or the IP address+the transport layer protocol type+the transport layer port number. The IP address herein includes the source IP address and/or the destination IP address, and the transport layer port number herein includes the source port number and/or the destination port number. Certainly, the one or more first fields may alternatively be another combination of the foregoing seven fields, and other combinations are not listed one by one herein.

Optionally, the one or more second fields may include one or more of seven fields that are a source IP address, a destination IP address, a DSCP, a flow label, a transport layer protocol type, a transport layer source port number, and a transport layer destination port number. It may be understood that the one or more second fields may be any one of or a combination of any n fields of the foregoing seven fields (where n is a positive integer greater than 1 and less than or equal to 7).

For example, the one or more second fields may be the IP address, the DSCP, the flow label, the transport layer protocol type, the transport layer port number, the flow label+ the DSCP, the IP address+the flow label, the IP address+the DSCP, the IP address+the flow label+the DSCP, or the IP address+the transport layer protocol type+the transport layer port number. The IP address herein includes the source IP address and/or the destination IP address, and the transport layer port number herein includes the source port number and/or the destination port number. Certainly, the one or more second fields may alternatively be another combination of the foregoing seven fields, and other combinations are not listed one by one herein.

Certainly, the one or more second fields herein are not completely the same as the one or more first fields, that is, at least one field is different.

For example, the one or more first fields may be the IP address, and the one or more second fields are the IP address+the DSCP.

Table 2 is a schematic table of the first configuration information, and content in the foregoing first implementation is described below with reference to Table 2. The $1^{st}$ row in Table 2 indicates a field, the $2^{nd}$ row to the $8^{th}$ row in Table 2 indicate a value range or a value of a corresponding field, the "IP address" in Table 2 may indicate the source IP address or the destination IP address, the "transport layer port number" in Table 2 may indicate the source port number or the destination port number, and "N/A" in Table 2 indicates that the first configuration information does not include a value range of a field corresponding to "N/A".

As shown in Table 2, when the IP address is any one of 120.109.1.1 to 120.109.1.10, the data packet is transmitted through an RLC channel whose RLC channel identifier is #1 (that is, there is a mapping relationship between any one of IP addresses 120.109.1.1 to 120.109.1.10 and the RLC channel identifier #1, each row in the following Table 2 indicates a mapping relationship and is not described again). When the flow label is 121, the data packet is transmitted through an RLC channel whose RLC channel identifier is #2. When the DSCP is 122, the data packet is transmitted through an RLC channel whose RLC channel identifier is #3. When the flow label is 123, and the DSCP is 124, the data packet is transmitted through an RLC channel whose RLC channel identifier is #4. When the IP address is 125.130.1.1, and the DSCP is 126, the data packet is transmitted through an RLC channel whose RLC channel identifier is #5. When the IP address is 127.168.2.101, and the flow label is 128, the data packet is transmitted through an RLC channel whose RLC channel identifier is #6. When the IP address is 129.113.105.0, the flow label is 130, and the DSCP is 131, the data packet is transmitted through an RLC channel whose RLC channel identifier is #7. When the IP address is 225.230.12.101, the transport layer protocol type is the TCP, and the transport layer port number is 68, the data packet is transmitted through an RLC channel whose RLC channel identifier is #8.

TABLE 2

| IP address | Flow label | DSCP | Transport layer protocol type | Transport layer port number | RLC channel identifier |
|---|---|---|---|---|---|
| 120.109.1.1 to 120.109.1.10 | N/A | N/A | N/A | N/A | #1 |
| N/A | 121 | N/A | N/A | N/A | #2 |
| N/A | N/A | 122 | N/A | N/A | #3 |
| N/A | 123 | 124 | N/A | N/A | #4 |
| 125.130.1.1 | N/A | 126 | N/A | N/A | #5 |
| 127.168.2.101 | 128 | N/A | N/A | N/A | #6 |
| 129.113.105.0 | 130 | 131 | N/A | N/A | #7 |
| 225.230.12.101 | N/A | N/A | TCP | 68 | #8 |

Optionally, the first configuration information may indicate any row in Table 2. For example, the first configuration information may indicate the $1^{st}$ row in Table 2, that is, when the IP address is any one of 120.109.1.1 to 120.109.1.10, the data packet is transmitted through the RLC channel whose RLC channel identifier is #1. In this case, the first configuration information may include the mapping relationship between any one of IP addresses 120.109.1.1 to 120.109.1.10 and the RLC channel identifier #1.

Optionally, the first configuration information may indicate any plurality of rows (such as two rows, three rows, or more rows) in Table 2. For example, the first configuration information may indicate the $1^{st}$ row and the $5^{th}$ row in Table 2, that is, when the IP address is any one of 120.109.1.1 to 120.109.1.10, the data packet is transmitted through the RLC channel whose RLC channel identifier is #1. When the IP address is 125.130.1.1, and the DSCP is 126, the data packet is transmitted through the RLC channel whose RLC channel identifier is #5. In this case, the first configuration information may include the mapping relationship between any one of IP addresses 120.109.1.1 to 120.109.1.10 and the RLC channel identifier #1, and a mapping relationship among the IP address 125.130.1.1, the DSCP 126, and the RLC channel identifier #5.

For example, if an IP address in the first data packet received by the donor DU is 125.130.1.1, and a value of the DSCP is 126, the donor DU may determine, based on Table 2, to transmit the first data packet through the RLC channel whose RLC channel identifier is #5.

According to the method in FIG. 6, the data packet may be mapped to an appropriate RLC channel by using an existing field in the data packet. When a QoS requirement of the data packet is met, no additional information exchange between the donor CU and the donor DU is required, thereby saving communication resources. In addition, the donor CU may flexibly select mapping fields for different data packets based on characteristics of the different data packets, and configure a flexible mapping rule. A large quantity of data packets in the IAB network may be mapped uniformly by using the mapping rule, thereby improving mapping efficiency.

Figure 7:
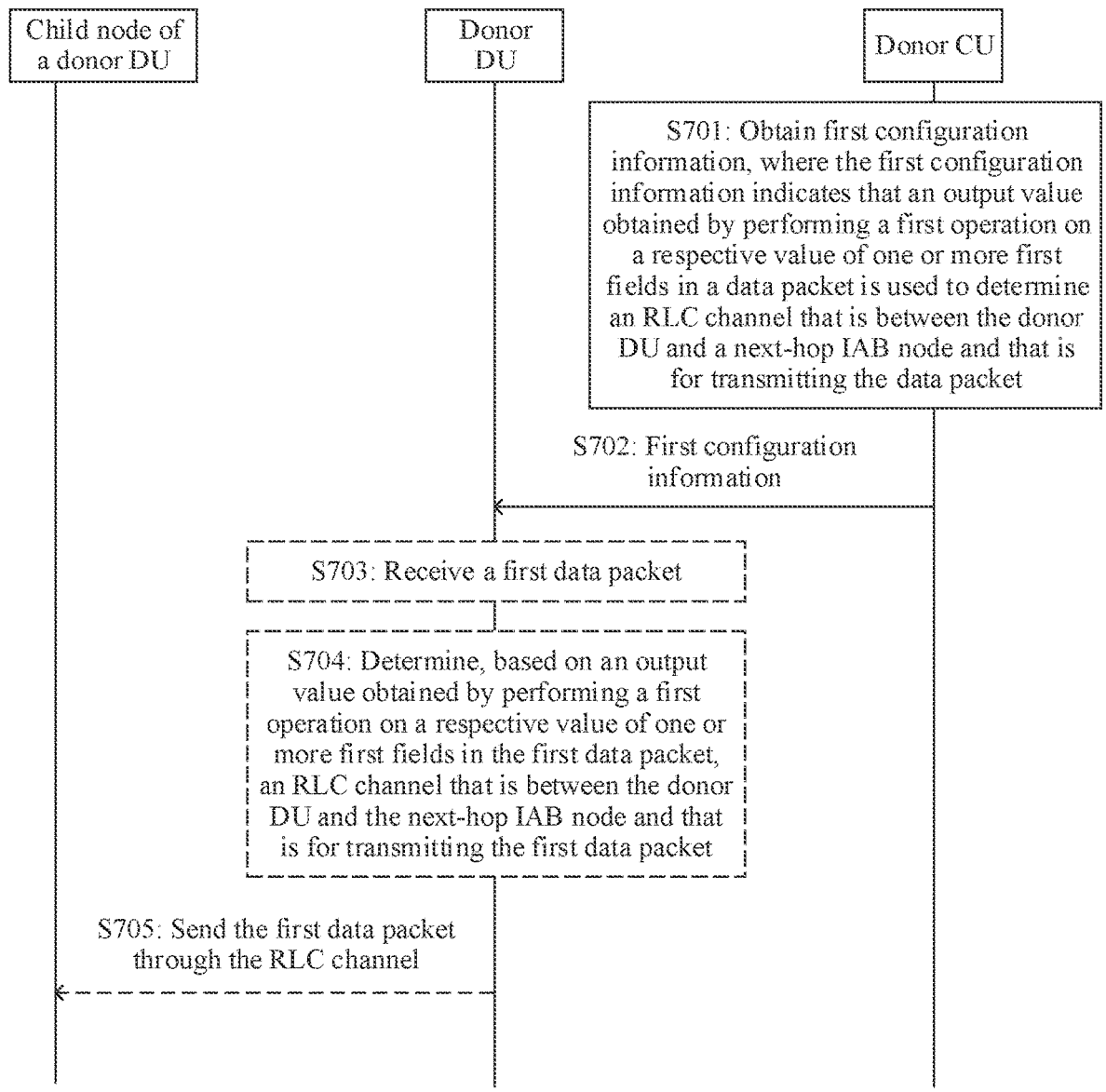
FIG. 7 is a schematic diagram of another configuration method according to an embodiment of this application.

FIG. 7 is a schematic diagram of another configuration method according to an embodiment of this application. As shown in FIG. 7, the method in FIG. 7 includes the following steps.

S701: A donor CU obtains first configuration information, where the first configuration information indicates that an output value obtained by performing a first operation on one or more respective values of one or more first fields in a data packet is used to determine an RLC channel that is between a donor DU and a child node of the donor DU and that is for transmitting the data packet.

Optionally, the data packet is a downlink data packet, and may be any data packet that may be received by the donor DU but not a specific data packet received by the donor DU. The first configuration information may not carry an identifier of the data packet. In other words, after receiving the data packet, the donor DU may determine, based on the first configuration information, an RLC channel for transmitting the data packet.

S702: The donor CU sends the first configuration information to the donor DU.

Optionally, the first configuration information may be carried in an F1AP message sent by the donor CU to the donor DU.

Optionally, after receiving the first configuration information, the donor DU may store the first configuration information.

S703: The donor DU receives a first data packet.

S704: The donor DU determines, based on an output value obtained by performing a first operation on one or more respective values of one or more first fields in the first data packet, an RLC channel that is between the donor DU and the child node of the donor DU and that is for transmitting the first data packet.

S705: Send the first data packet to the child node of the donor DU through the RLC channel.

For example, refer to FIG. 3. The child node of the donor DU is the IAB node 1.

According to the method in FIG. 7, each first field has a value, and an output value may be obtained by performing the first operation on the value of each field.

The first configuration information may indicate that when an output value obtained by performing first operation on respective values of a plurality of first fields in the data packet meets a first value range, the data packet is transmitted through a first RLC channel.

Optionally, the first value range of the output value may include one value, or include a plurality of consecutive or discrete values.

Optionally, the first operation may be a hash operation, an exclusive OR operation, or the like. A type of the first operation is not limited in this embodiment of this application, and any operation may be the first operation in this embodiment of this application.

Optionally, the first configuration information may include a mapping relationship between the first value range and an identifier of the first RLC channel.

Optionally, the first configuration information may include the plurality of first fields. That is, the first configuration information includes the plurality of first fields, the first value range, and the identifier of the first RLC channel.

Optionally, the first configuration information may not include the plurality of first fields, and the donor DU and the donor CU may preconfigure the one or more first fields. For a concept of preconfiguration herein, refer to related content in FIG. 6.

Optionally, the first configuration information may include the first operation. Alternatively, the first configuration information may not include the first operation, and the donor DU and the donor CU may preconfigure the first operation. Alternatively, the donor CU may indicate the first operation to the donor DU by using other information in addition to the first configuration information. For a concept of preconfiguration herein, refer to related content in FIG. 6.

Table 3 is a schematic table of the first configuration information, and content in FIG. 7 is described below with reference to Table 3. The $1^{st}$ row in Table 3 indicates a field, and the $2^{nd}$ row to the $8^{th}$ row in Table 3 indicate a value range or a value of a corresponding field.

As shown in Table 3, when the output value (referred to as an output value below for ease of description) obtained by performing the first operation on the respective value of the one or more first fields meets a range $O_1$, the data packet is transmitted through the first RLC channel (that is, there is a mapping relationship between the range $O_1$ of the output value and the first RLC channel; each row in the following Table 3 indicates a mapping relationship and is not described again). When the output value meets a range $O_2$, the data packet is transmitted through a second RLC channel. When the output value meets a range $O_3$, the data packet is transmitted through a third RLC channel. By analogy, when the output value meets a range $O_k$, the data packet is transmitted through a $K^{th}$ RLC channel. K may be an integer greater than or equal to 1. For example, when K is 1, the output value corresponds only to the range $O_1$, and when K is 2, the output value corresponds to the range $O_1$ and the range $O_2$. It should be noted that the range $O_k$ in Table 3 may include one value, or include a plurality of consecutive or discrete values.

TABLE 3

| Output value | RLC channel |
| --- | --- |
| Range $O_1$ | First RLC channel |
| Range $O_2$ | Second RLC channel |
| Range $O_3$ | Third RLC channel |
| . . . | . . . |
| Range $O_k$ | $K^{th}$ RLC channel |

Optionally, the range $O_1$, the range $O_2$, the range $O_3$, . . . , and the range $O_k$ of the output values in Table 3 may include outputs value obtained by performing the first operation on one or more first fields of all data packets that may be received by the donor DU. In this way, the donor DU may determine, based on the first configuration information, the RLC channel for transmitting the data packet regardless of the output value obtained by performing the first operation on the one or more first fields of the received data packet.

Optionally, the range $O_1$, the range $O_2$, the range $O_3$, ..., and the range $O_k$ in Table 3 do not overlap each other. In this way, when receiving the data packet, the donor DU may uniquely determine, based on the first configuration information, the RLC channel for transmitting the data packet, to map the data packet to an appropriate RLC channel for transmission.

Optionally, the first configuration information may indicate any row in Table 3. For example, the first configuration information may indicate the $1^{st}$ row in Table 3. In this case, the first configuration information may include a mapping relationship between the range $O_1$ of the output value and the first RLC channel.

Optionally, the first configuration information may indicate a plurality of rows (such as two rows, three rows, or more or all rows) in Table 3. For example, the first configuration information may indicate the $1^{st}$ row and the $2^{nd}$ row in Table 3. In this case, the first configuration information may include the mapping relationship between the range $O_1$ of the output value and the first RLC channel, and a mapping relationship between the range $O_2$ of the output value and a second RLC channel.

For example, when the output value obtained by performing the first operation on the respective value of the one or more first fields in the first data packet meets the range $O_3$ in Table 3, the donor DU sends the first data packet to the child node of the donor DU through a third RLC channel.

Optionally, the one or more first fields may be any one or more fields carried in a downlink data packet in an IAB network, for example, one or more fields in various protocol layer data headers of the downlink data packet in the IAB network. This is not limited in this embodiment of this application.

Optionally, the one or more first fields may include one or more of seven fields that are a source IP address, a destination IP address, a DSCP, a flow label, a transport layer protocol type, a transport layer source port number, and a transport layer destination port number. It may be understood that the one or more first fields may be any one of or a combination of any n fields of the foregoing seven fields (where n is a positive integer greater than 1 and less than or equal to 7).

For example, the one or more first fields may be an IP address, the DSCP, the flow label, the transport layer protocol type, a transport layer port number, the flow label+the DSCP, an IP address+the flow label, an IP address+the DSCP, an IP address+the flow label+the DSCP, or an IP address+the transport layer protocol type+a transport layer port number. The IP address herein includes the source IP address and/or the destination IP address. Certainly, the one or more first fields may alternatively be another combination of the foregoing seven fields, and other combinations are not listed one by one herein.

According to the method in FIG. 7, there may be many values of one or more fields, but a value range of an output value obtained by performing the first operation on the value of the one or more fields may be reduced. Therefore, an RLC channel is determined by using the value of the one or more fields, and limited RLC channels may be used to meet mapping requirements of a large quantity of data packets, so that the data packet is mapped to an appropriate RLC channel, thereby meeting a QoS requirement of the data packet. In addition, according to the method in FIG. 7, a value of one or more existing fields is used, and no additional information exchange between the donor CU and the donor DU is required, thereby saving communication resources.

The foregoing describes solution 1 in the embodiments of this application with reference to FIG. 6 and FIG. 7. In solution 1, the donor CU directly indicates the method for determining the RLC channel for transmitting the data packet, so that the data packet is mapped to an appropriate RLC channel for transmission.

The following describes solution 2 in the embodiments of this application. A difference between solution 2 and solution 1 lies in that the donor CU first indicates to the donor DU, fields used to determine an RLC channel to which a data packet is to be mapped, and then the donor DU determines, based on the fields, the RLC channel to which the data packet is to be mapped. For ease of description below, the fields used to determine the RLC channel to which the data packet is to be mapped are referred to as mapping fields, and a field used to determine the mapping field is referred to as a reference field.

Solution 2

Figure 8:
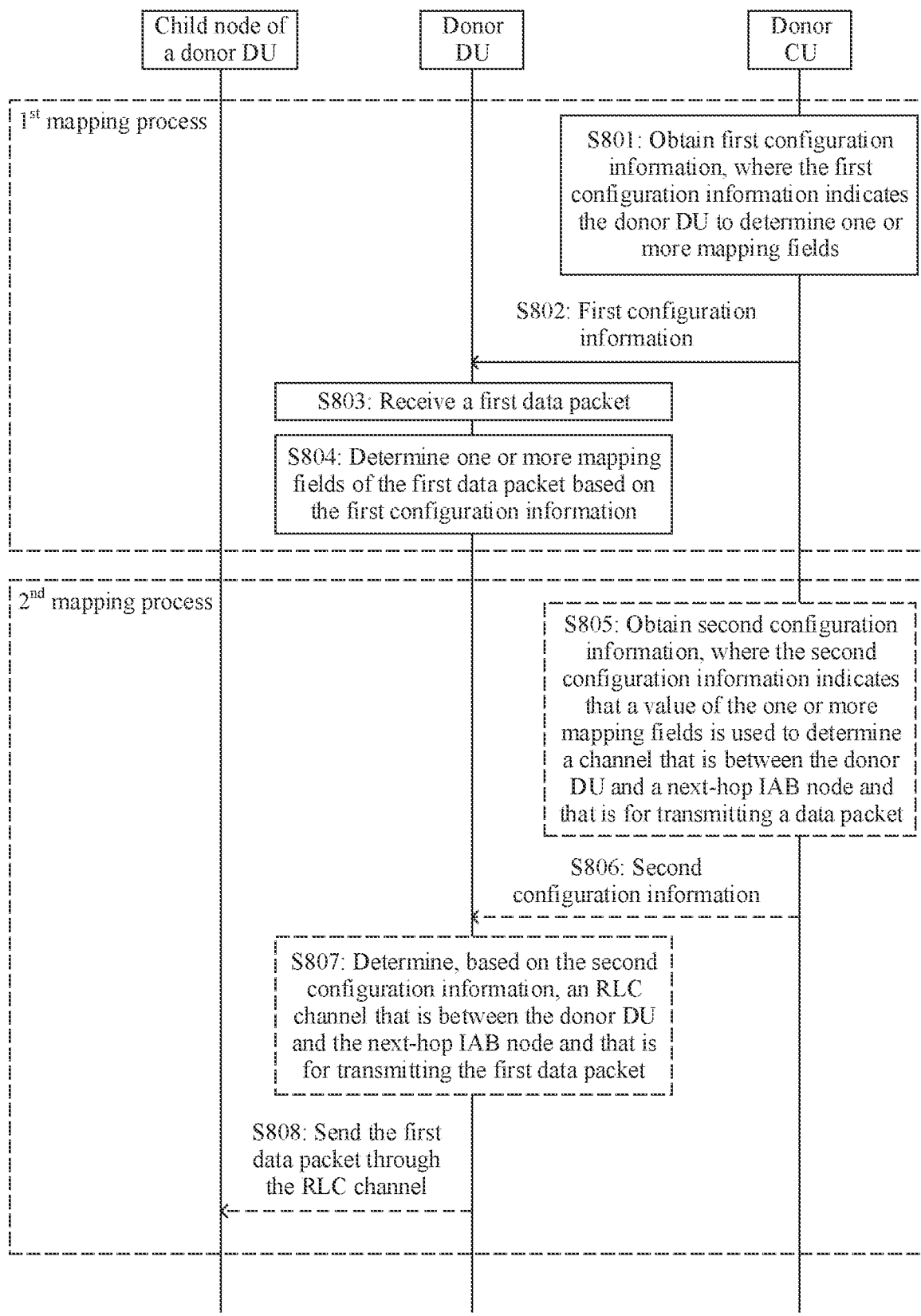
FIG. 8 is a schematic diagram of another configuration method according to an embodiment of this application.

FIG. 8 is a schematic diagram of another configuration method according to an embodiment of this application. As shown in FIG. 8, the following steps are included.

S801 to S804 are the $1^{st}$ mapping process, where a donor CU may indicate a donor DU to determine one or more mapping fields.

S801: The donor CU obtains first configuration information, where the first configuration information indicates the donor DU to determine the one or more mapping fields.

The obtaining herein may be understood as generating, determining, or receiving by the donor CU from another network element, for example, receiving from a network management system.

The one or more mapping fields are used to determine an RLC channel that is between the donor DU and a child node of the donor DU and that is for transmitting a data packet.

In a first implementation, the first configuration information may indicate that one or more respective values of one or more reference fields in the data packet is used to determine the one or more mapping fields of the data packet.

In a first example, the first configuration information may indicate that when the one or more respective values of the one or more reference fields correspondingly meets the one or more respective first reference value ranges of the one or more reference fields, the one or more mapping fields of the data packet are one or more first fields of the data packet.

In a second example, the first configuration information indicates that an output value obtained by performing first operation on one or more respective values of a plurality of reference fields in the data packet is used to determine the one or more mapping fields of the data packet.

Optionally, the first configuration information may indicate that when the output value obtained by performing the first operation on the respective values of the plurality of reference fields in the data packet meets a value range of the first operation, the one or more mapping fields of the data packet are the one or more first fields of the data packet.

In a second implementation, the first configuration information may indicate that a quantity of RLC channels between the donor DU and the child node of the donor DU is used to determine the one or more mapping fields of the data packet.

In a third implementation, the first configuration information indicates the one or more mapping fields.

In the foregoing several implementations, the data packet is a downlink data packet, and may be any data packet that may be received by the donor DU but not a specific data packet received by the donor DU. The first configuration information may not carry an identifier of the data packet. In other words, after receiving the data packet, the donor DU may determine the one or more mapping fields based on the first configuration information.

S802: The donor CU sends the first configuration information to the donor DU.

Optionally, after receiving the first configuration information, the donor DU may store the first configuration information.

Optionally, the first configuration information may be carried in an F1AP message sent by the donor CU to the donor DU.

S803: The donor DU receives a first data packet.

S804: The donor DU determines one or more mapping fields of the first data packet based on the first configuration information.

In the first implementation, the donor DU determines the one or more mapping fields of the data packet based on one or more respective values of one or more reference fields in the first data packet.

In the first example, the donor DU may determine whether the one or more respective values of the one or more reference fields correspondingly meets the one or more respective first reference value ranges of the one or more reference fields. When the one or more respective values of the one or more reference fields correspondingly meets the one or more respective first reference value ranges of the one or more reference fields, the one or more mapping fields of the data packet are one or more first fields of the first data packet.

In the second example, the donor DU may determine whether an output value obtained by performing the first operation on respective values of a plurality of reference fields in the first data packet meets the value range of the first operation. When the output value obtained by performing the first operation on the respective values of the plurality of reference fields in the first data packet meets the value range of the first operation, the one or more mapping fields of the first data packet are the one or more first fields of the data packet.

In the second implementation, the quantity of RLC channels between the donor DU and the child node of the donor DU is used to determine the one or more mapping fields of the first data packet.

That is, second configuration information indicates the donor DU to determine the one or more mapping fields of the first data packet based on the quantity of RLC channels between the donor DU and the child node of the donor DU.

In the third implementation, the donor DU may obtain the one or more mapping fields based on the first configuration information.

S805 to S808 are the $2^{nd}$ mapping process, where the donor CU may indicate the donor DU to determine the RLC channel based on the one or more values of the one or more mapping fields.

S805 to S808 are optional.

S805: The donor CU obtains the second configuration information, where the second configuration information indicates that the one or more values of the one or more mapping fields is used to determine the RLC channel that is between the donor DU and the child node of the donor DU and that is for transmitting the data packet.

Optionally, S805 and S801 may be performed at the same time, for example, carried in a same message.

In a first implementation, the second configuration information indicates that an output value obtained by performing the first operation on one or more respective values of the one or more mapping fields in the data packet is used to determine the RLC channel that is between the donor DU and the child node of the donor DU and that is for transmitting the data packet. The one or more mapping fields herein are the one or more first fields in FIG. 7. For details, refer to the method in FIG. 7, and details are not described herein again.

In a second implementation, the second configuration information indicates that when the respective one or more values of the one or more mapping fields meets one or more respective first mapping value ranges of the one or more mapping fields, the RLC channel that is between the donor DU and the child node of the donor DU and that is for transmitting the data packet is a first RLC channel. The following describes the second implementation.

Optionally, the second configuration information includes a mapping relationship between the one or more respective first mapping value ranges of the one or more mapping fields and an identifier of the first RLC channel.

It should be noted that a first reference value range of each of the one or more mapping fields may be different from a first reference value range of another mapping field.

Optionally, the first reference value range of each mapping field may include one value, or include a plurality of consecutive or discrete values.

Table 4 is a schematic table of the second configuration information provided in this embodiment of this application.

It is assumed that the one or more mapping fields are M mapping fields, as shown in the $1^{st}$ row in Table 4, that is, a mapping field 1, a mapping field 2, . . . , and a mapping field M, and M is an integer greater than or equal to 1.

As shown in the $2^{nd}$ row in Table 4, when a value of the mapping field 1 of the data packet meets a first mapping value range of the mapping field 1, a value of the mapping field 2 meets a first mapping value range of the mapping field 2, and a value of a mapping field M meets a first mapping value range of the mapping field M, the RLC channel for transmitting the data packet is transmitted is the first RLC channel.

As shown in the $3^{rd}$ row in Table 4, when the value of the mapping field 1 of the data packet meets a second mapping value range of the mapping field 1, the value of the mapping field 2 meets a second mapping value range of the mapping field 2, and the value of the mapping field K meets a second mapping value range of the mapping field K, the RLC channel for transmitting the data packet is a second RLC channel.

By analogy, the second configuration information may further indicate that when the respective value of the one or more mapping fields correspondingly meets a respective $Y^{th}$ mapping value range of the one or more mapping fields, the RLC channel for transmitting the data packet is a $Y^{th}$ RLC channel, where Y is an integer greater than or equal to 1, as shown in the $5^{th}$ row in Table 4. Details are not described herein again.

TABLE 4

| Mapping field 1 | Mapping field 2 | . . . | Mapping field M | RLC channel |
|---|---|---|---|---|
| First mapping value range | First mapping value range | . . . | First mapping value range | First RLC channel |
| Second mapping value range | Second mapping value range | . . . | Second mapping value range | Second RLC channel |
| . . . | . . . | . . . . . . | . . . | . . . |
| $Y^{th}$ mapping value range | $Y^{th}$ mapping value range | . . . | $Y^{th}$ mapping value range | $Y^{th}$ RLC channel |

Optionally, all rows in Table 4 may cover all possible values of the M mapping fields in the data packet. In this way, after receiving the data packet, the donor DU may determine, based on the second configuration information, the RLC channel for transmitting the data packet regardless of the values of the M mapping fields in the data packet.

Optionally, mapping value ranges of the rows in Table 4 may be set, so that the respective value of the one or more mapping fields in the data packet can meet only one row in Table 4. In this way, after receiving the data packet, the donor DU may uniquely determine, based on the second configuration information, the RLC channel for transmitting the data packet, to map the data packet to an appropriate RLC channel for transmission.

For example, in S804, the donor DU determines that the one or more mapping fields of the data packet are an IP address, a DSCP, and a flow label.

In this case, the second configuration information indicates the donor DU to determine, based on values of the IP address, the DSCP, and the flow label, the RLC channel that is between the donor DU and the child node of the donor DU and that is for transmitting the data packet.

Table 5 is a schematic table of the second configuration information is this embodiment of this application. As shown in Table 5, the $1^{st}$ row in Table 5 indicates a field, and the $2^{nd}$ row to the $5^{th}$ row in Table 5 indicate a value range or a value of a corresponding field.

TABLE 5

| IP address | DSCP | Flow label | RLC Channel identifier |
| --- | --- | --- | --- |
| 120.109.1.1 to 120.109.1.10 | 121 | 122 to 124 | #1 |
| 120.109.1.1 to 120.109.1.10 | 122 to 130 | 125 | #2 |
| ... | ... | ... | ... |
| 225.230.12.0 to 225.230.12.101 | 130 to 150 | 126 to 121 | #Y |

S806: The donor CU sends the second configuration information to the donor DU.

Optionally, a sequence of S806 and S802 is not limited. S806 and S802 may be performed at the same time, for example, may be carried in a same F1AP message. Alternatively, S802 is performed first, and then S806 is performed. Alternatively, S806 may be performed first, and then S802 is performed.

S807: The donor DU determines, based on the second configuration information, an RLC channel that is between the donor DU and the child node of the donor DU and that is for transmitting the first data packet.

Optionally, S807 and S804 may be performed at the same time, or S804 is performed first, and then S807 is performed.

For example, refer to Table 5. For example, if the IP address of the data packet is 120.109.1.8, the DSCP is 123, and the flow label is 125, the donor DU may determine to transmit the data packet through an RLC channel whose RLC channel identifier is #2.

S808: The donor DU sends the first data packet to the child node of the donor DU through the RLC channel.

For example, the donor DU sends the first data packet to the child node of the donor DU through an RLC channel whose RLC channel identifier is #1.

Alternatively, S805 to S808 may be replaced by using the method in FIG. 6. This is not limited in this embodiment of this application.

Optionally, S805 to S808 may be independently performed, and do not depend on S801 to S804, that is, S801 to S804 are optional.

According to the method in FIG. 8, the donor CU may first indicate the donor DU to determine the one or more mapping fields, and the mapping field of the data packet may be determined based on characteristics of different data packets, to flexibly set a mapping rule to meet mapping requirements of a large quantity of data packets in an IAB network.

Figure 9:
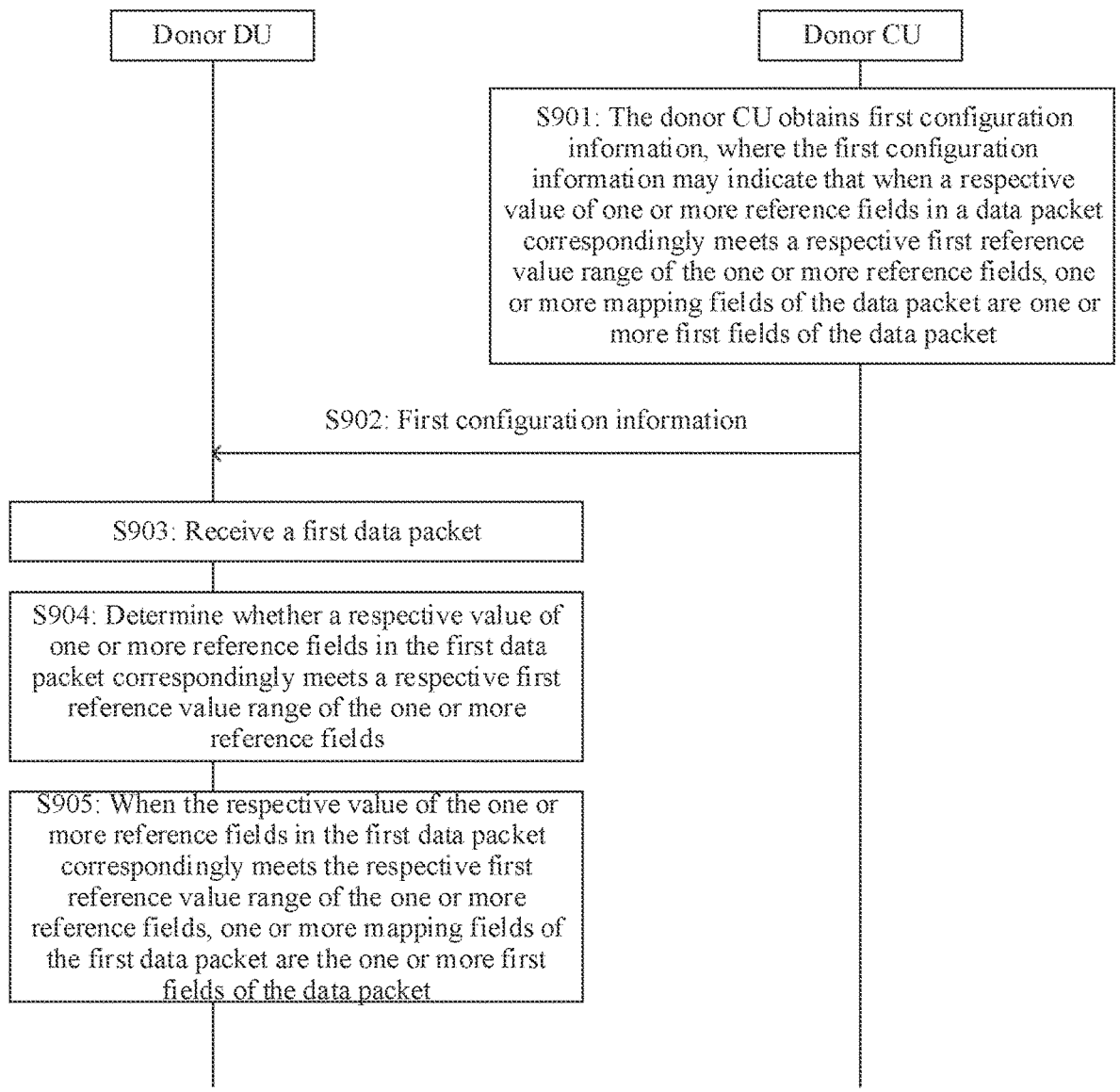
FIG. 9 is a schematic diagram of another configuration method according to an embodiment of this application.
Figure 10:
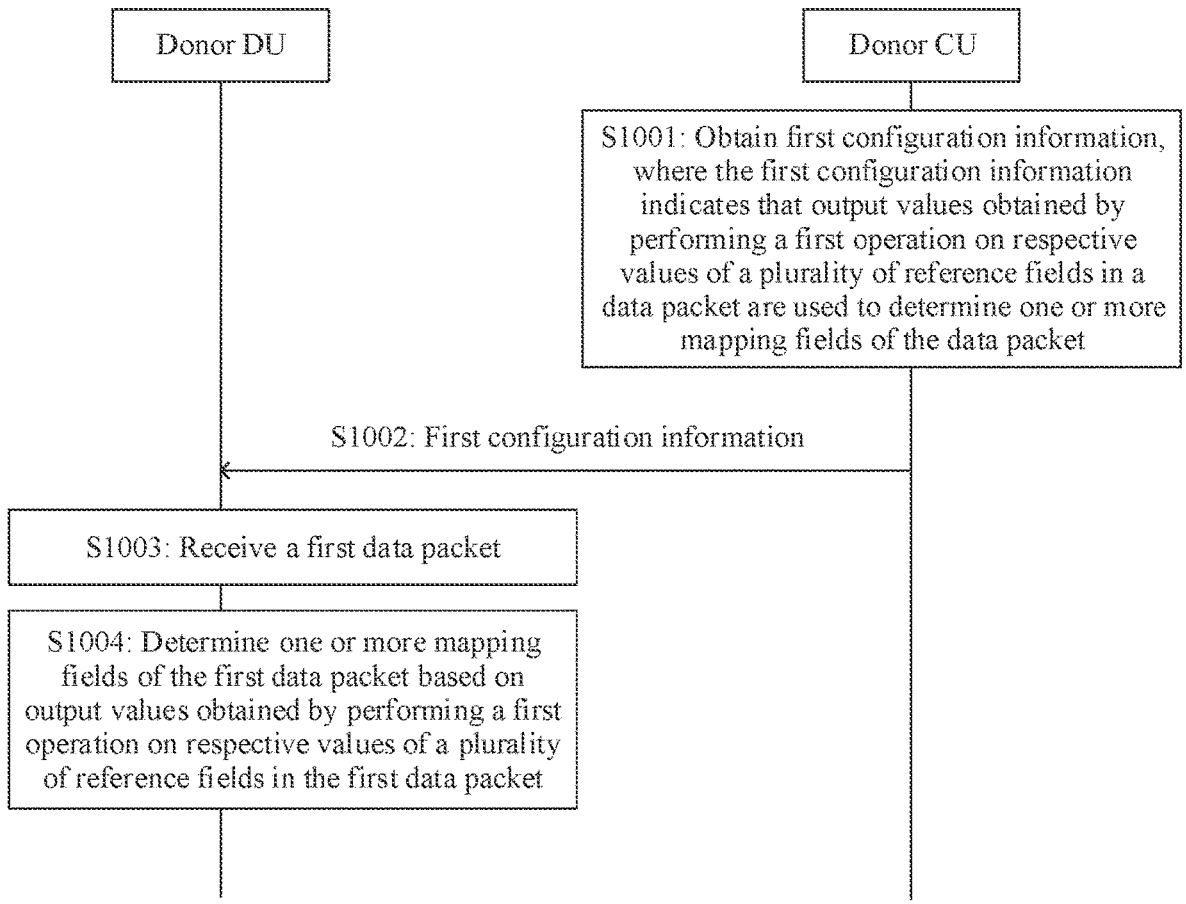
FIG. 10 is a schematic diagram of another configuration method according to an embodiment of this application.
Figure 11:
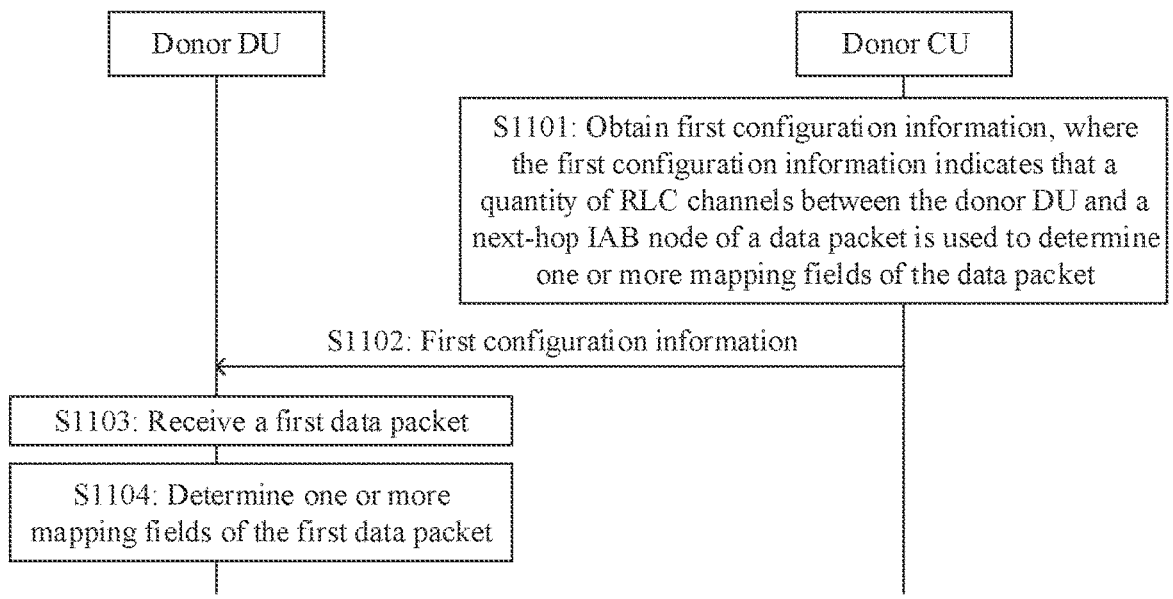
FIG. 11 is a schematic diagram of another configuration method according to an embodiment of this application.

The following separately describes the $1^{st}$ mapping process in FIG. 8 with reference to FIG. 9 to FIG. 11. It should be noted that content in FIG. 8 to FIG. 11 may be mutually referenced.

FIG. 9 is a schematic diagram of another configuration method according to an embodiment of this application. FIG. 9 corresponds to the first example in the first implementation in FIG. 8. As shown in FIG. 9, the method in FIG. 9 includes the following steps.

S901: A donor CU obtains first configuration information, where the first configuration information may indicate that when one or more respective values of one or more reference fields in a data packet correspondingly meets one or more respective first reference value ranges of the one or more reference fields, one or more mapping fields of the data packet are one or more first fields of the data packet.

The one or more mapping fields are used to determine an RLC channel that is between a donor DU and a child node of the donor DU and that is for transmitting the data packet.

The obtaining herein may be understood as generating, determining, or receiving by the donor CU from another network element, for example, receiving from a network management system.

Optionally, the first configuration information includes a mapping relationship between the one or more respective first reference value ranges of the one or more reference fields and the one or more first fields.

It should be noted that although names of the first reference value range of each of the one or more reference fields and a first reference value range of another reference field are all first reference value ranges, the first reference value ranges may be different.

Optionally, the first reference value range of each reference field may include one value, or include a plurality of consecutive or discrete values.

Table 6 is a schematic table of the first configuration information provided in this embodiment of this application.

It is assumed that the one or more reference fields are K reference fields, as shown in the $1^{st}$ row in Table 6, that is, a reference field 1, a reference field 2, ..., and a reference field K, and K is an integer greater than or equal to 1. The $2^{nd}$ row to the $5^{th}$ row in Table 6 indicate a value range, a value, or a mapping field of a corresponding field.

As shown in the $2^{nd}$ row in Table 6, when a value of the reference field 1 of the data packet meets a first reference value range of the reference field 1, a value of the reference field 2 meets a first reference value range of the reference field 2, and a value of the reference field K meets a first reference value range of the reference field K, the one or more mapping fields are the one or more first fields.

As shown in the $3^{rd}$ row in Table 6, when the value of the reference field 1 of the data packet meets a second reference value range of the reference field 1, the value of the reference field 2 meets a second reference value range of the reference field 2, and the value of the reference field K meets a second reference value range of the reference field K, the one or more mapping fields are one or more second fields.

By analogy, the first configuration information may further indicate that when the one or more respective value of the one or more reference fields correspondingly meets one or more respective $X^{th}$ reference value ranges of the one or more reference fields, the one or more mapping fields of the data packet are one or more $X^{th}$ fields of the data packet, and X is an integer greater than or equal to 1, as shown in the $5^{th}$ row in Table 6. Details are not described herein again.

TABLE 6

| Reference field 1 | Reference field 2 | ... | Reference field K | One or more mapping fields |
|---|---|---|---|---|
| First reference value range | First reference value range | ... | First reference value range | One or more first fields |
| Second reference value range | Second reference value range | ... | Second reference value range | One or more second fields |
| ... | ... | ... | ... | ... |
| $X^{th}$ reference value range | $X^{th}$ reference value range | ... | $X^{th}$ reference value range | One or more $X^{th}$ fields |

Optionally, in Table 6, one or more mapping fields in any two rows may have an overlapping field, for example, the one or more first fields and the one or more second fields may have a same field.

Optionally, all rows of Table 6 may cover all possible values of the K reference fields in the data packet. In this way, after receiving the data packet, the donor DU may determine, based on the first configuration information, the one or more mapping fields regardless of the values of the K reference fields in the data packet.

Optionally, reference value ranges of the rows in Table 6 may be set, so that the one or more respective values of the one or more reference fields in the data packet can meet only one row in Table 6. In this way, after receiving the data packet, the donor DU may uniquely determine, based on the first configuration information, the one or more mapping fields, to map the data packet to an appropriate RLC channel for transmission.

Optionally, the first configuration information includes the one or more reference fields.

Optionally, the one or more reference fields include one or more of any field in an IP header of an Internet Protocol version 4 (Internet Protocol version 4, IPv4) data packet, any field in an IP header of an Internet Protocol version 6 (Internet Protocol version 6, IPv6) data packet, a source port number (that is, a source port number of a transport layer, which is alternatively referred to as a transport layer source port number), a destination port number (that is, a destination port number of a transport layer, which is alternatively referred to as a transport layer destination port number).

Any field in the IP header of the IPv4 data packet may include one or more of the following: a version, a header length, a service type (type of service), a DSCP, a total length, an identifier, a flag, a fragment offset, a time to live, a protocol (that is, a transport layer protocol type), a header checksum, a source IP address, and a destination IP address. Because some bits (for example, 6 bits) in the field of the service type are the DSCP fields, optionally, a reference field included in the first configuration information may include one of the DSCP field or the field of the service type.

Any field in the IP header of the IPv6 data packet may include one or more of the following: one or more fields of a version, a traffic class (traffic class), a DSCP, a flow label, a payload length, a next header (that is, a transport layer protocol type), a hop limit, a source IP address, and a destination IP address. Because some bits (for example, 6 bits) in the field of the traffic class are the DSCP fields, optionally, a reference field included in the first configuration information may include one of the DSCP field or the field of the traffic class.

Optionally, the one or more mapping fields may be any one or more fields carried in a downlink data packet in an IAB network, for example, one or more fields in various protocol layer data headers of the downlink data packet in the IAB network. This is not limited in this embodiment of this application.

Optionally, the one or more mapping fields include one or more of a flow label field, a DSCP field, a source IP address field, a destination IP address field, a transport layer protocol type field, a transport layer source port number, and a transport layer destination port number. For details, refer to related content in FIG. 7. Details are not described herein again.

Table 7 is a schematic table of the first configuration information provided in this embodiment of this application. Table 7 may be understood as an example of Table 6.

The $1^{st}$ row in Table 7 indicates the DSCP field, and the $2^{nd}$ row to the $8^{th}$ row in Table 7 indicate a value range of the DSCP field and the one or more mapping fields. In Table 7, an example in which the one or more first fields are the DSCP fields is used for description. A person skilled in the art may understand that the DSCP in Table 7 may be replaced with one or more fields of any field in the IP header of the IPv4 data packet, any field in the IP header of the IPv6 data packet, the source port number, and the destination port number. When the DSCP is replaced with a plurality of fields, each row in Table 7 indicates what field is the one or more mapping fields when values of the plurality of fields respectively meet value ranges.

As shown in Table 7, when a value of the DSCP in the data packet meets a range $D_1$, the one or more mapping fields are an IP address and the flow label. When a value of the DSCP in the data packet meets a range $D_2$, the one or more mapping fields are the flow label. When an output value meets a range $D_3$, the one or more mapping fields are the DSCP. When an output value meets a range $D_4$, the one or more mapping fields are an IP address. When an output value meets a range $D_5$, the one or more mapping fields are an IP address and the DSCP. When an output value meets a range $D_6$, the one or more mapping fields are an IP address, the DSCP, and the flow label. When an output value meets a range $D_7$, the one or more mapping fields are the flow label and the DSCP. When the output value meets a range $D_8$, the one or more mapping fields are an IP address, the transport layer protocol type, and a transport layer port number. The rest may be deduced by analogy. The IP address herein may be the source IP address and/or the destination IP address. The transport layer port number may be the transport layer source port number and/or the transport layer destination port number.

TABLE 7

| DSCP | One or more mapping fields |
|---|---|
| Range $D_1$ | IP address + flow label |
| Range $D_2$ | Flow label |
| Range $D_3$ | DSCP |
| Range $D_4$ | IP address |
| Range $D_5$ | IP address + DSCP |
| Range $D_6$ | IP address + DSCP + flow label |
| Range $D_7$ | Flow label + DSCP |
| Range $D_8$ | IP address + transport layer protocol type + transport layer port number |
| ... | ... |

Optionally, the first configuration information may indicate each row in Table 7, for example, may include a mapping relationship between a range of the DSCP of each row and the one or more mapping fields.

S902: The donor CU sends the first configuration information to the donor DU.

S903: The donor DU receives a first data packet.

S904: The donor DU determines whether one or more respective values of one or more reference fields in the first data packet correspondingly meets one or more respective first reference value ranges of the one or more reference fields.

Refer to Table 6. The donor DU may determine whether the one or more respective values of the one or more reference fields in the first data packet correspondingly meets one or more respective value ranges of one or more reference fields in a specific row in Table 6. If the one or more respective values of the one or more reference fields in the first data packet correspondingly meets the one or more respective value ranges of the one or more reference fields in the row in Table 6, one or more mapping fields of the first data packet are one or more mapping fields corresponding to the row.

For example, refer to Table 7. If a value of a DSCP of the first data packet meets the range $D_6$, the one or more mapping fields of the first data packet are the IP address+the DSCP+the flow label.

S905: When the one or more respective values of the one or more reference fields in the first data packet meets the one or more respective first reference value ranges of the one or more reference fields, the donor DU determines that the one or more mapping fields of the first data packet are the one or more first fields of the data packet.

Optionally, the method in FIG. 9 may further include S805 to S808 in FIG. 8. For details, refer to FIG. 8. Details are not described herein again.

According to the method in FIG. 9, one or more mapping fields may be determined by comparing one or more values of one or more existing reference fields with one or more value ranges of the one or more reference fields. This is simple and efficient, and no additional information exchange between the donor CU and the donor DU is caused, thereby saving communication resources.

FIG. 10 is a schematic diagram of another configuration method according to an embodiment of this application. FIG. 10 corresponds to the second example in the first implementation in FIG. 8. As shown in FIG. 10, the method in FIG. 10 includes the following steps.

S1001: A donor CU obtains first configuration information, where the first configuration information indicates that an output value obtained by performing a first operation on respective values of a plurality of reference fields in a data packet is used to determine one or more mapping fields of the data packet.

Each reference field has a value, and an output value may be obtained by performing the first operation on the value of each reference field.

Optionally, the first configuration information may indicate a mapping relationship between the output value and the one or more mapping fields.

Optionally, the first configuration information may indicate that when the output value obtained by performing the first operation on the respective values of the plurality of reference fields in the data packet meets a first value range, the one or more mapping fields of the data packet are one or more first fields Optionally, the first operation may be a hash operation, an exclusive OR operation, or the like. A type of the first operation is not limited in this embodiment of this application, and any operation may be the first operation in this embodiment of this application.

Optionally, the first value range of the output value may include one value, or include a plurality of consecutive or discrete values.

Optionally, the first configuration information may include a mapping relationship between the first value range of the output value and the one or more first fields.

Optionally, the first configuration information may include the plurality of reference fields. That is, the first configuration information includes the plurality of reference fields, the first value range, and the one or more first fields.

Optionally, the first configuration information may not include the plurality of reference fields, and a donor DU and the donor CU may preconfigure the plurality of reference fields.

Optionally, the first configuration information may include the first operation. Alternatively, the first configuration information may not include the first operation, and the donor DU and the donor CU may preconfigure the first operation.

For the preconfiguration, refer to related content in FIG. 6. Details are not described herein again.

Optionally, the first configuration information may further indicate that when the output value obtained by performing the first operation on the one or more respective values of the plurality of reference fields in the data packet meets a second value range, the one or more mapping fields of the data packet are one or more second fields Table 8 is a schematic table of the first configuration information, and descriptions are provided below with reference to Table 8. The $1^{st}$ row in Table 8 indicates a field, and the $2^{nd}$ row to the $6^{th}$ row in Table 3 indicate one or more value ranges or one or more values of a corresponding field.

As shown in Table 8, when an output value (referred to as an output value below for ease of description) obtained by performing the first operation on one or more respective values of the one or more first fields meets a range $O_1$, the one or more mapping fields are the one or more first fields (that is, there is a mapping relationship between the range $O_1$ of the output value and the one or more first fields; each row in the following Table 8 indicates a mapping relationship and is not described again). When the output value meets a range $O_2$, the one or more mapping fields are the one or more second fields. When the output value meets a range $O_3$, the one or more mapping fields are one or more third fields. By analogy, when the output value meets a range $O_z$, the one or more mapping fields are one or more $Z^{th}$ fields. $Z$ may be an integer greater than or equal to 1. For example, when $Z$ is 1, the output value corresponds only to the range $O_1$, and when $Z$ is 2, the output value corresponds to the range $O_1$ and the range $O_2$.

TABLE 8

| Output value | One or more mapping fields |
| --- | --- |
| Range $O_1$ | One or more first fields |
| Range $O_2$ | One or more second fields |
| Range $O_3$ | One or more third fields |
| ... | ... |
| Range $O_z$ | One or more $Z^{th}$ fields |

Optionally, the range $O_1$, the range $O_2$, the range $O_3, \ldots,$ and the range $O_z$ of the output values in Table 8 may include output values obtained by performing the first operation on one or more reference fields of all data packets that may be received by the donor DU. In this way, the donor DU may determine, based on the first configuration information, the one or more mapping fields regardless of the output value obtained by performing the first operation on the one or more reference fields of the received data packet.

Optionally, the range $O_1$, the range $O_2$, the range $O_3$, . . . , and the range $O_z$ in Table 8 do not overlap each other. In this way, when receiving the data packet, the donor DU may uniquely determine the one or more mapping fields based on the first configuration information, to map, based on the one or more mapping fields, the data packet to an appropriate RLC channel for transmission.

Optionally, the first configuration information may indicate any row in Table 8. For example, the first configuration information may indicate the 1 row in Table 8. In this case, the first configuration information may include a mapping relationship between the range $O_1$ of the output value and the one or more first fields.

Optionally, the first configuration information may indicate a plurality of rows (such as two rows, three rows, or more or all rows) in Table 8. For example, the first configuration information may indicate the $1^{st}$ row and the $2^{nd}$ row in Table 8. In this case, the first configuration information may include the mapping relationship between the range $O_1$ of the output value and the one or more first fields, and a mapping relationship between the range $O_2$ of the output value and the one or more second fields.

Optionally, the one or more first fields are not completely the same as the one or more second fields, that is, at least one first field is different from the one or more second fields. The one or more first fields and the one or more second fields may have an overlapping field.

Optionally, the one or more reference fields include one or more of any field in an IP header of an IPv4 data packet, any field in an IP header of an IPv6 data packet, a source port number (that is, a source port number of a transport layer, which is alternatively referred to as a transport layer source port number), a destination port number (that is, a destination port number of a transport layer, which is alternatively referred to as a transport layer destination port number). For the field in the IP header of the IPv4 data packet and the field in the IP header of the IPv4 data packet, refer to related content in FIG. 9. Details are not described herein again.

Optionally, the one or more mapping fields may be any one or more fields carried in a downlink data packet in an IAB network, for example, one or more fields in various protocol layer data headers of the downlink data packet in the IAB network. This is not limited in this embodiment of this application.

Optionally, the one or more mapping fields may include one or more of seven fields that are a source IP address, a destination IP address, a DSCP, a flow label, a transport layer protocol type, a transport layer source port number, and a transport layer destination port number. It may be understood that the one or more mapping fields may be any one of or a combination of any n fields of the foregoing seven fields (where n is a positive integer greater than 1 and less than or equal to 7).

For example, the one or more mapping fields may be an IP address, the DSCP, the flow label, the transport layer protocol type, a transport layer port number, the flow label+ the DSCP, an IP address+the flow label, an IP address+the DSCP, an IP address+the flow label+the DSCP, or an IP address+the transport layer protocol type+a transport layer port number. The IP address herein includes the source IP address and/or the destination IP address, and the transport layer port number herein includes the transport layer source port number and/or the transport layer destination port number. Certainly, the one or more mapping fields may alternatively be another combination of the foregoing seven fields, and other combinations are not listed one by one herein.

Table 9 is another schematic table of the first configuration information provided in this embodiment of this application. The $1^{st}$ row in Table 9 indicates a field, and the $2^{nd}$ row to the $8^{th}$ row in Table 9 indicate a value range or a value of a corresponding field. Table 9 may be understood as an example of Table 8.

As shown in Table 9, when an output value (referred to as an output value below for ease of description) obtained by performing the first operation on one or more respective values of the one or more first fields meets a range $O_1$, the one or more mapping fields are the IP address and the flow label (that is, there is a mapping relationship between the range $O_1$ of the output value and the one or more first fields; each row in the following Table 9 indicates a mapping relationship and is not described again). When the output value meets a range $O_2$, the one or more mapping fields are the flow label. When the output value meets a range $O_3$, the one or more mapping fields are the DSCP. By analogy, when the output value meets a range $O_8$, the one or more mapping fields are the IP address+the transport layer protocol type+ the transport layer port number.

TABLE 9

| Output value | One or more mapping fields |
| --- | --- |
| Range $O_1$ | IP address + flow label |
| Range $O_2$ | Flow label |
| Range $O_3$ | DSCP |
| Range $O_4$ | IP address |
| Range $O_5$ | IP address + DSCP |
| Range $O_6$ | IP address + DSCP + flow label |
| Range $O_7$ | DSCP + flow label |
| Range $O_8$ | IP address + transport layer protocol type + transport layer port number |

S1002: The donor CU sends the first configuration information to the donor DU.

S1003: The donor DU receives a first data packet.

S1004: The donor DU determines one or more mapping fields of the first data packet based on an output value obtained by performing a first operation on respective values of a plurality of reference fields in the first data packet.

For example, refer to Table 8. When the output value obtained by performing the first operation on the respective values of the plurality of reference fields in the first data packet meet the range $O_1$, the one or more mapping fields are the one or more first fields.

For example, refer to Table 9. When the output value obtained by performing the first operation on the respective values of the plurality of reference fields in the first data packet meet the range $O_1$, the one or more mapping fields are the IP address+flow label.

Optionally, the method in FIG. 10 may further include S805 to S808 in FIG. 8. For details, refer to FIG. 8. Details are not described herein again.

According to the method in FIG. 10, one or more mapping fields may be determined by comparing an output value obtained by performing an operation on one or more values of one or more existing reference fields with a range of the output value. This is simple and efficient, and does not cause additional information interaction between the donor CU and the donor DU, thereby saving communication resources.

FIG. 11 is a schematic diagram of another configuration method according to an embodiment of this application.

FIG. 11 corresponds to the second implementation in FIG. 8. As shown in FIG. 11, the method in FIG. 11 includes the following steps.

S1101: A donor CU obtains first configuration information, where the first configuration information indicates that a quantity of RLC channels between a donor DU and a child node of the donor DU is used to determine one or more mapping fields of a data packet.

The first configuration information may indicate a mapping relationship between the quantity of RLC channels between the donor DU and the child node of the donor DU and the one or more mapping fields.

Optionally, the first configuration information may indicate that when the quantity of RLC channels between the donor DU and the child node of the donor DU meets a first value range, the one or more mapping fields of the data packet are one or more first fields.

Optionally, the first value range may include one value, or include a plurality of consecutive or discrete values.

Optionally, the first configuration information may include a mapping relationship between the first value range and the one or more first fields.

Table 10 is a schematic table of the first configuration information, and descriptions are provided below with reference to Table 10. The $1^{st}$ row in Table 10 indicates content of each column (a range of the quantity of RLC channels, and the one or more mapping fields), and the $2^{nd}$ row to the $6^{th}$ row in Table 10 indicate a value range of the content in the $1^{st}$ row.

As shown in Table 10, when the quantity of RLC channels between the donor DU and the child node of the donor DU (referred to as a quantity of RLC channels below for ease of description) meets a range $O_1$, the one or more mapping fields are the one or more first fields (that is, there is a mapping relationship between the range $O_1$ of the quantity of RLC channels and the one or more first fields; each row in the following Table 10 indicates a mapping relationship and is not described again). When the quantity of RLC channels meets a range $O_2$, the one or more mapping fields are one or more second field. When the quantity of RLC channels meets a range $O_3$, the one or more mapping fields are one or more third fields. By analogy, when the quantity of RLC channels meets a range $O_z$, the one or more mapping fields are one or more $Z^{th}$ fields. Z may be an integer greater than or equal to 1. For example, when Z is 1, an output value corresponds only to the range $O_1$, and when Z is 2, an output value corresponds to the range $O_1$ and the range $O_2$.

TABLE 10

| Range of a quantity of RLC channels between a donor DU and a child node of the donor DU | One or more mapping fields |
| --- | --- |
| Range $O_1$ | One or more first fields |
| Range $O_2$ | One or more second fields |
| Range $O_3$ | One or more third fields |
| . . . | . . . |
| Range $O_z$ | One or more $Z^{th}$ fields |

Optionally, the range $O_1$, the range $O_2$, the range $O_3$, . . . , and the range $O_z$ of the output values in Table 10 may cover all possible quantities of RLC channels. In this way, the donor DU may determine, based on the first configuration information, the one or more mapping fields regardless of the quantity of RLC channels.

Optionally, the range $O_1$, the range $O_2$, the range $O_3$, . . . , and the range $O_z$ in Table 10 do not overlap each other. In this way, when receiving the data packet, the donor DU may uniquely determine the one or more mapping fields based on the first configuration information, to map, based on the one or more mapping fields, the data packet to an appropriate RLC channel for transmission.

Optionally, the first configuration information may indicate any row in Table 10. For example, the first configuration information may indicate the $1^{st}$ row in Table 10. In this case, the first configuration information may include a mapping relationship between the range $O_1$ of the quantity of the RLC channels and the one or more first fields.

Optionally, the first configuration information may indicate a plurality of rows (such as two rows, three rows, or more or all rows) in Table 10. For example, the first configuration information may indicate the $1^{st}$ row and the $2^{nd}$ row in Table 10. In this case, the first configuration information may include the mapping relationship between the range $O_1$ of the quantity of the RLC channels and the one or more first fields, and a mapping relationship between the range $O_2$ of the quantity of the RLC channels and the one or more second fields.

Optionally, the one or more first fields are not completely the same as the one or more second fields, that is, at least one first field is different from the one or more second fields. The one or more first fields and the one or more second fields may have an overlapping field.

Optionally, the one or more mapping fields may be any one or more fields carried in a downlink data packet in an IAB network, for example, one or more fields in various protocol layer data headers of the downlink data packet in the IAB network. This is not limited in this embodiment of this application.

Optionally, the one or more mapping fields may include one or more of seven fields that are a source IP address, a destination IP address, a DSCP, a flow label, a transport layer protocol type, a transport layer source port number, and a transport layer destination port number. It may be understood that the one or more first fields may be any one of or a combination of any n fields of the foregoing seven fields (where n is a positive integer greater than 1 and less than or equal to 7).

For example, the one or more mapping fields may be an IP address, the DSCP, the flow label, the transport layer protocol type, a transport layer port number, the flow label+the DSCP, an IP address+the flow label, an IP address+the DSCP, an IP address+the flow label+the DSCP, or an IP address+the transport layer protocol type+a transport layer port number. The IP address herein includes the source IP address and/or the destination IP address. Certainly, the one or more mapping fields may alternatively be another combination of the foregoing seven fields, and other combinations are not listed one by one herein.

S1102: The donor CU sends the first configuration information to the donor DU.

S1103: The donor DU receives a first data packet.

Si 104: The donor DU determines one or more mapping fields of the first data packet based on the first configuration information.

For example, refer to Table 10. When the quantity of RLC channels meets the range $O_1$, the one or more mapping fields of the first data packet are the one or more first fields.

Optionally, FIG. 11 may further include S805 to S808. For details, refer to the description in FIG. 8. Details are not described herein again.

According to the method in FIG. 11, an RLC channel to which the data packet is to be mapped may be flexibly determined based on the quantity of RLC channels between the donor DU and the child node of the donor DU. For example, when the quantity of RLC channels is relatively large, it indicates that resources of the RLC channel are relatively sufficient, and the data packet may be mapped to a dedicated RLC channel, for example, an RLC channel in a one-to-one mapping manner, based on a flow label field in the data packet. When the quantity of RLC channels is relatively small, it indicates that resources of the RLC channel are relatively insufficient, and the data packet may be mapped to a shared RLC channel, for example, an RLC channel in a many-to-one mapping manner, based on a DSCP field in the data packet. Therefore, it is ensured that each data packet is mapped to an appropriate RLC channel for transmission. In addition, the quantity of RLC channels between the donor DU and the child node of the donor DU is used to determine the RLC channel to which the data packet is to be mapped. Therefore, no additional information exchange between the donor CU and the donor DU is caused, thereby saving communication resources.

Figure 12A:
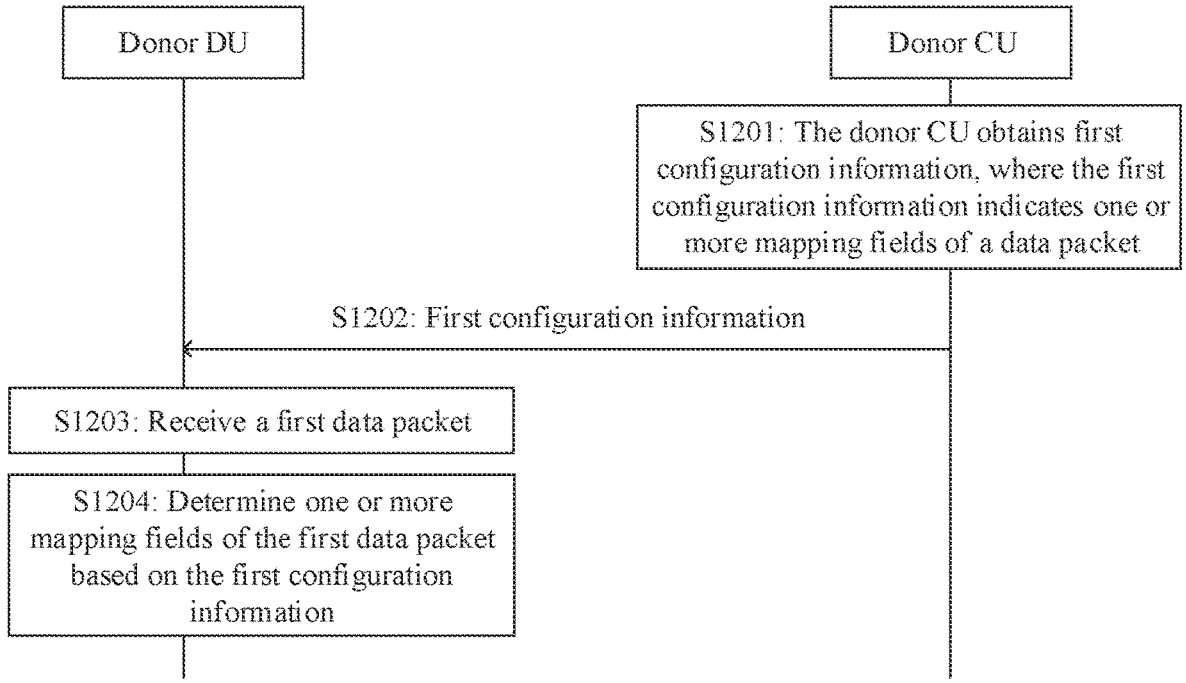
FIG. 12A is a schematic diagram of another configuration method according to an embodiment of this application.

FIG. 12A is a schematic diagram of another configuration method according to an embodiment of this application. FIG. 12A corresponds to the third implementation in FIG. 8. As shown in FIG. 12A, the method in FIG. 12A includes the following steps.

S1201: A donor CU obtains first configuration information, where the first configuration information indicates one or more mapping fields of a data packet.

Optionally, the first configuration information may carry an identifier of the data packet. In this case, the first configuration information may include one or more mapping fields corresponding to a plurality of data packets. For example, the plurality of data packets are data packets received by a donor DU in a next period of time.

Optionally, the first configuration information may not carry an identifier of the data packet. For example, before the donor CU sends one or more data packets to a donor DU, the donor CU sends the first configuration information to the donor DU, to indicate one or more mapping fields that are to be sent in a next period of time and that correspond to the one or more data packets.

Optionally, the one or more mapping fields may include one or more of seven fields that are a source IP address, a destination IP address, a DSCP, a flow label, a transport layer protocol type, a transport layer source port number, and a transport layer destination port number. It may be understood that the one or more mapping fields may be any one of or a combination of any n fields of the foregoing seven fields (where n is a positive integer greater than 1 and less than or equal to 7).

For example, the one or more mapping fields may be an IP address, the DSCP, the flow label, the transport layer protocol type, a transport layer port number, the flow label+ the DSCP, an IP address+the flow label, an IP address+the DSCP, an IP address+the flow label+the DSCP, or an IP address+the transport layer protocol type+a transport layer port number. The IP address herein includes the source IP address and/or the destination IP address. Certainly, the one or more mapping fields may alternatively be another combination of the foregoing seven fields, and other combinations are not listed one by one herein.

S1202: The donor CU sends the first configuration information to the donor DU.

S1203: The donor DU receives a first data packet.

S1204: The donor DU determines one or more mapping fields of the first data packet based on the first configuration information.

The donor DU may determine the one or more mapping fields by reading the first configuration information.

Optionally, FIG. 12A may further include S805 to S808. For details, refer to the description in FIG. 8. Details are not described herein again.

According to the method in FIG. 12A, the donor CU may directly indicate the one or more mapping fields of the data packet to the donor DU. This is simple and direct, and does not require an operation such as comparison and an operation by the donor DU, to ensure that each data packet is mapped to an appropriate RLC channel for transmission, thereby meeting a QoS requirement.

In the foregoing solution 1 and solution 2, the data packet received by the donor DU may be received from the donor CU or received from another network device (for example, an OAM server or a network management system). When generating the data packet, the donor CU needs to respectively set one or more values of the one or more mapping fields for the one or more mapping fields in the data packet, so that the donor DU determines, based on the one or more values of the one or more mapping fields in the data packet and the first configuration information and/or the second configuration information in FIG. 6 to FIG. 12A, an RLC channel to which the data packet is to be mapped.

Figure 12B:
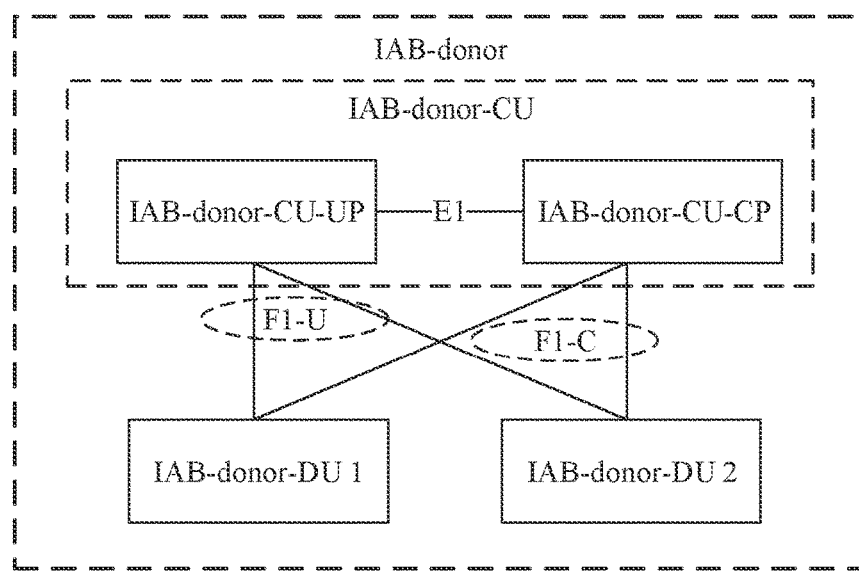
FIG. 12B is a schematic diagram of a structure of an IAB donor according to an embodiment of this application.

FIG. 12B is a schematic diagram of a structure of an IAB donor according to an embodiment of this application. As shown in FIG. 12B, the IAB donor (that is, a donor base station, an IAB donor, or a donor node) may include one IAB donor CU and one or more IAB donor DUs, for example, an IAB donor DU 1 and an IAB donor DU 2. The IAB donor CU includes a user plane (user plane, UP) of an IAB donor CU and a control plane (control plane, CP) of the IAB donor CU. An interface between the UP of the IAB donor CU (which may be referred to as an IAB donor CU-UP for short) and an IAB donor DU (for example, the IAB donor DU 1 and the IAB donor DU 2) is an F1-U interface. An interface between the CP of the IAB donor CU and the IAB donor DU (for example, the IAB donor DU 1 and the IAB donor DU 2) is an F1-C interface.

The UP of the IAB donor CU may generate a data packet, and set one or more values of one or more mapping fields for the data packet, but the UP of the IAB donor CU may fail to determine how to set the one or more values of the one or more mapping fields for the data packet. Accordingly, this embodiment of this application provides a method, and the method includes the following steps.

M1: The CP of the IAB donor CU sends configuration information to the UP of the IAB donor CU.

The configuration information includes a correspondence between bearer information and the one or more mapping fields.

Optionally, the bearer information may be information used to identify a bearer, and may be a GTP TEID, or a GTP TEID and a destination IP address. Alternatively, the bearer information may include an identifier of UE and an identifier of a data radio bearer (data radio bearer, DRB) of the UE. The GTP TEID is a tunnel endpoint identifier (tunnel endpoint identifier, TEID for short) of a general packet radio service tunneling protocol (general packet radio service tunneling protocol, GTP for short) tunnel. The GTP tunnel is a user plane tunnel of an F1 interface between the IAB donor CU-UP and an IAB node accessed by the UE, and is in a one-to-one correspondence with the DRB of the UE. In this application, the GTP TEID may be a downlink GTP TEID (that is, a TEID allocated by the IAB node), or an uplink GTP TEID (that is, a TEID allocated by the IAB donor CU-UP). The destination IP address is an IP address of the IAB node.

Optionally, when a data packet passed through the IAB donor CU may be used to distinguish the DRB of the UE by using a GTP TEID field, the bearer information may include only the GTP TEID. When a data packet passed through the IAB donor CU may not be used to distinguish the DRB of the UE by using only a GTP TEID field, the bearer information may further include the destination IP address.

Optionally, for the one or more mapping fields, refer to content in FIG. 6 to FIG. 12A. For example, the one or more mapping fields may be one or more of the DSCP and the flow label.

For example, Table 11 is a schematic table of the configuration information. The configuration information may indicate that when the IP address is a first IP address, and the GTP TEID is a first GTP TEID, a value of a DSCP of the data packet is a first DSCP and a value of a flow label field of the data packet is a first flow label.

TABLE 11

| IP address | GTP TEID | DSCP | Flow label |
|---|---|---|---|
| First IP address | First GTP TEID | First DSCP | First flow label |
| ... | ... | ... | ... |

Optionally, both the CP of the IAB donor CU and the UP of the IAB donor CU store the bearer information.

M2: The UP of the IAB donor CU determines the one or more values of the one or more mapping fields of the data packet based on the configuration information.

Optionally, the UP of the IAB donor CU may store the bearer information. After receiving the configuration information, the UP of the IAB donor CU may determine the one or more values of the one or more mapping fields of the data packet with reference to the bearer information stored in the IAB donor CU-UP, to generate the data packet.

For example, the JAB donor CU-UP receives a first data packet, where the first data packet is a user plane downlink data packet of the UE, and needs to be sent to the UE by using the IAB donor DU and the IAB node. The IAB donor CU-UP first determines bearer information of the first data packet. For example, when the IAB donor CU-UP receives the first data packet, information related to a QoS flow (QoS flow) is encapsulated outside the first data packet. A UE DRB to which the data packet belongs may be determined based on a preconfigured mapping relationship between the QoS flow and the UE DRB, and the bearer information is further determined. Then, the one or more values of the one or more mapping fields is determined based on a correspondence between the bearer information and a mapping field in the configuration information. The first data packet may be encapsulated to obtain a to-be-sent data packet, and a newly encapsulated header carries the determined one or more values of the one or more mapping fields.

M3: The UP of the IAB donor CU sends the data packet to the IAB donor DU.

According to the method, the IAB-donor-CU-UP may add an appropriate value of the DSCP and/or the flow label to a downlink data packet, so that the IAB-donor-DU performs bearer mapping on the data packet according to a preconfigured mapping rule.

The foregoing describes solution 1 and solution 2 in the embodiments of this application with reference to FIG. 6 to FIG. 12B. It should be noted that solution 1 and solution 2 are described by using a downlink as an example, and content in solution 1 and solution 2 is also applicable to an uplink. In this case, the donor DU in FIG. 6 to FIG. 12B may be replaced with an access IAB node (for example, the IAB node 2 in FIG. 3). The RLC channel between the donor DU and the child node of the donor DU in FIG. 6 to FIG. 12B may be replaced with an RLC channel between the access IAB node and a parent node of the access IAB node. In FIG. 6 to FIG. 12B, that the donor DU sends the data packet to the child node of the donor DU through the RLC channel may be replaced with that the access IAB node sends the data packet to the parent node of the access IAB node through the RLC channel. Configuration information involved in determining, by the access IAB node, the RLC channel that is between the access IAB node and the parent node and that is for transmitting the data packet and a determining process are the same as the configuration information involved in determining, by the donor DU, the RLC channel that is between the donor DU and the child node and that is for transmitting the data packet and the determining process in FIG. 6 to FIG. 12B.

Figure 13:
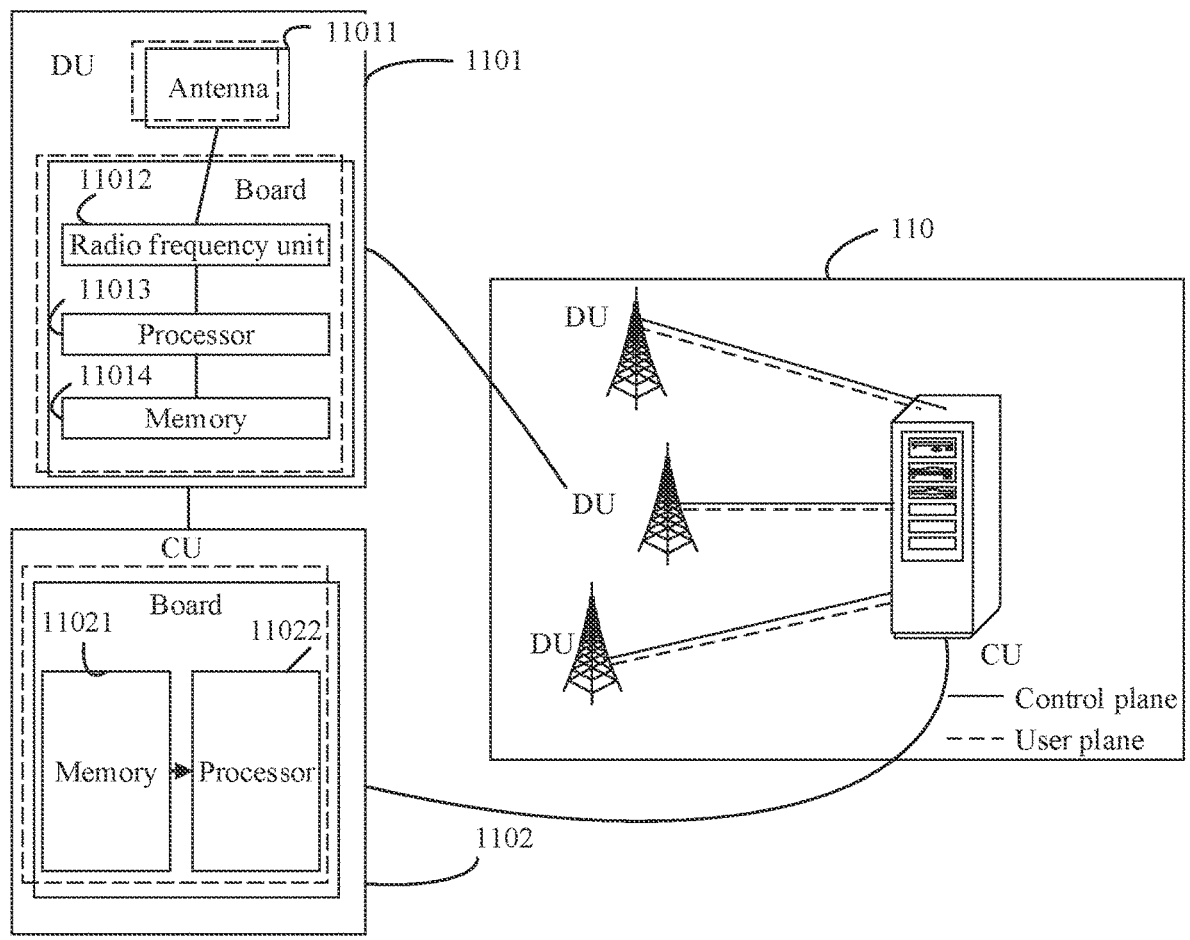
FIG. 13 is a schematic diagram of a structure of a network device according to an embodiment of this application.

FIG. 13 is a schematic diagram of a structure of a network device according to an embodiment of this application, for example, may be a schematic diagram of a structure of a base station. For example, FIG. 13 may be a schematic diagram of a structure of a donor base station. When a base station 110 is the donor base station, a DU included in the donor base station may be a donor DU, and a CU included in the donor base station may be a donor CU. As shown in FIG. 13, the base station may be applied to the systems shown in FIG. 1 to FIG. 3, to perform a function of the donor base station in the foregoing method embodiments. The base station 110 may include one or more DUs 1101 and one or more CUs 1102. The DU 1101 may include at least one antenna 11011, at least one radio frequency unit 11012, at least one processor 11013, and at least one memory 11014. The DU 1101 is mainly configured to: receive and send a radio frequency signal, convert a radio frequency signal and a baseband signal, and perform partial baseband processing. The CU 1102 may include at least one processor 11022 and at least one memory 11021. The CU 1102 and the DU 1101 may communicate with each other through an interface. A control plane (Control plane) interface may be Fs-C, for example, F1-C, and a user plane (User Plane) interface may be Fs-U, for example, F1-U.

The CU 1102 is mainly configured to: perform baseband processing, control the base station, and the like. The DU 1101 and the CU 1102 may be physically disposed together, or may be physically separated, namely, a distributed base station. The CU 1102 is a control center of the base station, may also be referred to as a processing unit, and is mainly configured to complete a baseband processing function. For example, the CU 1102 may be configured to control the base station to perform an operation procedure related to the network device in the foregoing method embodiments.

Optionally, baseband processing on the CU and the DU may be divided based on protocol layers of a wireless network. For example, functions of a packet data convergence protocol (packet data convergence protocol, PDCP) layer and a protocol layer above the PDCP layer are set in the CU. Functions of protocol layers below the PDCP, such as a radio link control (radio link control, RLC) layer and a media access control (media access control, MAC) layer, are set in the DU. For another example, the CU implements functions of a radio resource control (radio resource control, RRC) layer and a packet data convergence protocol (packet data convergence protocol, PDCP) layer. The DU implements functions of a radio link control (radio link control, RLC) layer, a media access control (media access control, MAC) layer, and a physical (physical, PHY) layer.

In addition, optionally, the base station 110 may include one or more radio frequency units (RUs), one or more DUs, and one or more CUs. The DU may include the at least one processor 11013 and the at least one memory 11014, the RU may include the at least one antenna 11011 and the at least one radio frequency unit 11012, and the CU may include the at least one processor 11022 and the at least one memory 11021.

In an example, the CU 1102 may include one or more boards, and a plurality of boards may jointly support a radio access network (for example, a 5G network) of a single access standard, or may separately support radio access networks (such as an LTE network, a 5G network, or another network) of different access standards. The memory 11021 and the processor 11022 may serve one or more boards. In other words, the memory and the processor may be separately disposed on each board. Alternatively, a plurality of boards may share a same memory and a same processor. In addition, a necessary circuit may be further disposed on each board. The DU 1101 may include one or more boards, and a plurality of boards may jointly support a radio access network (for example, a 5G network) of a single access standard, or may separately support radio access networks (such as an LTE network, a 5G network, or another network) of different access standards. The memory 11014 and the processor 11013 may serve one or more boards. In other words, the memory and the processor may be separately disposed on each board. Alternatively, a plurality of boards may share a same memory and a same processor. In addition, a necessary circuit may be further disposed on each board.

Optionally, the processor 11022 of the CU 1102 may execute a program or instructions in the memory 11021, to perform functions of the donor CU in FIG. 6 to FIG. 12B.

Optionally, the processor 11013 of the DU 1101 may execute a program or instructions in the memory 11014, to perform functions of the donor DU in FIG. 6 to FIG. 12B.

Optionally, the processor 11022 of the CU 1102 may obtain the first configuration information and/or the second configuration information in FIG. 6 to FIG. 12B, and the memory 11021 of the CU 1102 may store the first configuration information and/or the second configuration information in FIG. 6 to FIG. 12B. The CU 1102 may send configuration information to the DU 1101 through an interface between the CU 1102 and the DU 1101, where the configuration information may be the first configuration information and/or the second configuration information in FIG. 6 to FIG. 12B.

Optionally, the DU 1101 may receive a data packet from the CU 1102 through an interface between the CU 1102 and the DU 1101, or receive a data packet from another network device through a network interface, for example, receive a data packet from an OAM server through a network interface.

Optionally, the processor 11013 of the DU 1101 may perform a corresponding operation based on the first configuration information and/or the second configuration information in FIG. 6 to FIG. 12B, for example, an operation of S604, S704, S804, S807, S904, S1004, S1104, or S1204.

Optionally, the processor 11013 of the DU 1101 may send the data packet to a child node of the DU, for example, an IAB node 1, by using the antenna 11011 through a first RLC channel, for example, an operation of S605, S705, or S808.

Figure 14:
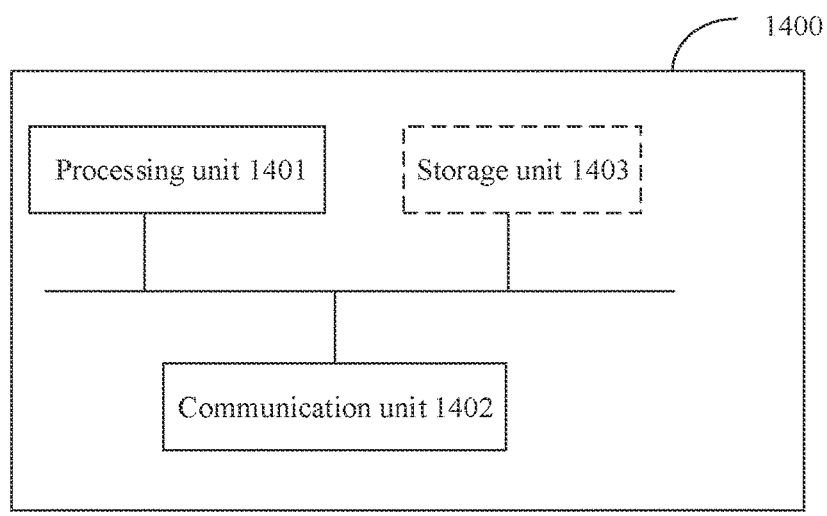
FIG. 14 is a schematic diagram of a structure of a communication apparatus 1400 according to an embodiment of this application.

FIG. 14 is a schematic diagram of a structure of a communication apparatus 1400 according to an embodiment of this application. The communication apparatus 1400 may perform the method described in the foregoing method embodiments. For details, refer to the descriptions in the foregoing method embodiments. The communication apparatus 1400 may be used in a communication device, a circuit, a hardware component, or a chip. For example, the communication apparatus 1400 may be a donor CU, a chip in a donor CU, a donor DU, a chip in a donor DU, an access IAB node, or a chip in an access IAB node.

As shown in FIG. 14, the communication apparatus 1400 includes a processing unit 1401 and a communication unit 1402. Optionally, the communication apparatus 1400 further includes a storage unit 1403.

The processing unit 1401 may be an apparatus having a processing function, and may include one or more processors. The processor may be a general-purpose processor, a dedicated processor, or the like. The processor may be a baseband processor or a central processing unit. The baseband processor may be configured to process a communication protocol and communication data. The central processing unit may be configured to: control an apparatus (for example, a base station, a terminal, or a chip), execute a software program, and process data of the software program.

The communication unit 1402 may be an apparatus for inputting (receiving) or outputting (sending) a signal, and is configured to perform signal transmission with another network device or another component in a device.

The storage unit 1403 may be an apparatus having a storage function, and may include one or more memories.

Optionally, the processing unit 1401, the communication unit 1402, and the storage unit 1403 are connected by using a communication bus.

Optionally, the storage unit 1403 may exist independently, and is connected to the processing unit 1401 by using the communications bus. The storage unit 1403 may alternatively be integrated into the processing unit 1401.

The communication apparatus 1400 may be the donor DU in this embodiment of this application. A schematic diagram of the donor DU may be that of the DU 1101 shown in FIG. 13. Optionally, the communication unit 1402 of the apparatus 1400 may include the interface between the DU 1101 and the CU 1102. Optionally, the communication unit 1402 may further include the radio frequency unit 11012 and the antenna 11011 of the DU 1101.

The communication apparatus 1400 may be the chip in the donor DU in this embodiment of this application. The communication unit 1402 may be an input/output interface, a pin, a circuit, or the like. The storage unit 1403 may be a register, a cache, a RAM, or the like, and the storage unit 1403 may be integrated together with the processing unit 1401. The storage unit 1403 may be a ROM or another type of static storage device that can store static information and instructions, and the storage unit 1403 may be independent of the processing unit 1401. Optionally, with development of wireless communication technologies, a radio frequency unit may be integrated into the communication apparatus 1400. For example, the radio frequency unit 11012 shown in FIG. 13 is integrated into the communication unit 1402.

When the communication apparatus 1400 is the donor DU or the chip in the donor DU, the processing unit 1401 may complete the method performed by the donor DU in the foregoing embodiment.

In a possible design, the processing unit 1401 may include instructions, and the instructions may be run on a processor, so that the communication apparatus 1400 performs the method of the terminal in the foregoing embodiment.

In another possible design, the storage unit 1403 stores instructions, and the instructions may be run on the processing unit 1401, so that the communication apparatus 1400 performs the method of the terminal in the foregoing embodiment. Optionally, the storage unit 1403 may further store data. Optionally, the processing unit 1401 may also store instructions and/or data.

For example, the communication unit 1402 may receive the configuration information in FIG. 6 to FIG. 12B from the donor CU, the communication unit 1402 may receive a data packet from the donor CU or another network device, and the processing unit 1401 may determine an RLC channel for transmitting the data packet or determine a mapping field. For details, refer to related content of the donor DU in FIG. 6 to FIG. 12B. Details are not described herein again.

The communication apparatus 1400 may be the donor CU in this embodiment of this application. A schematic diagram of the donor CU may be that of the CU 1102 shown in FIG. 13. Optionally, the communication unit 1402 of the apparatus 1400 may include the interface between the DU 1101 and the CU 1102. Optionally, the communication unit 1402 may further include an interface between the donor CU and another network device.

The communication apparatus 1400 may be the chip in the donor CU in this embodiment of this application. The communication unit 1402 may be an input/output interface, a pin, a circuit, or the like. The storage unit 1403 may be a register, a cache, a RAM, or the like, and the storage unit 1403 may be integrated together with the processing unit 1401. The storage unit 1403 may be a ROM or another type of static storage device that can store static information and instructions, and the storage unit 1403 may be independent of the processing unit 1401.

When a communication apparatus 1400 is the donor CU or the chip in the donor CU, the processing unit 1401 may complete the method performed by the donor CU in the foregoing embodiment.

In a possible design, the processing unit 1401 may include instructions, and the instructions may be run on a processor, so that the communication apparatus 1400 performs the method of the donor CU in the foregoing embodiment.

In another possible design, the storage unit 1403 stores instructions, and the instructions may be run on the processing unit 1401, so that the communication apparatus 1400 performs the method of the access network device in the foregoing embodiment. Optionally, the storage unit 1403 may further store data. Optionally, the processing unit 1401 may also store instructions and/or data.

For example, the processing unit 1401 may obtain the configuration information in FIG. 6 to FIG. 12B, and the communication unit 1402 may send the configuration information to a donor DU. For details, refer to related content of the donor CU in FIG. 6 to FIG. 12B. Details are not described herein again.

The communication apparatus 1400 may be the IAB node in this embodiment of this application, for example, an access IAB node or a child node of a donor DU. Optionally, the communication unit 1402 of the apparatus 1400 may include a transceiver and an antenna of the access IAB node. Optionally, the communication unit 1402 may further include an interface between the access IAB node and another network device, for example, an F1 interface between the access IAB node and the donor CU.

The communication apparatus 1400 may be a chip in a donor IAB node in this embodiment of this application. The communication unit 1402 may be an input/output interface, a pin, a circuit, or the like. The storage unit 1403 may be a register, a cache, a RAM, or the like, and the storage unit 1403 may be integrated together with the processing unit 1401. The storage unit 1403 may be a ROM or another type of static storage device that can store static information and instructions, and the storage unit 1403 may be independent of the processing unit 1401.

When the communication apparatus 1400 is the child node of the donor DU or a chip in the child node of the donor DU, the processing unit 1401 may complete the method performed by the child node of the donor DU in the foregoing embodiment.

In a possible design, the processing unit 1401 may include instructions, and the instructions may be run on a processor, so that the communication apparatus 1400 performs the method of the child node of the donor DU in the foregoing embodiment.

In another possible design, the storage unit 1403 stores instructions, and the instructions may be run on the processing unit 1401, so that the communication apparatus 1400 performs the method of the child node of the donor DU in the foregoing embodiment. Optionally, the storage unit 1403 may further store data. Optionally, the processing unit 1401 may also store instructions and/or data.

For example, the communication unit 1402 may receive a data packet from the donor DU through an RLC channel. For details, refer to related content of the child node of the donor DU in FIG. 6 to FIG. 12B. Details are not described herein again.

When the communication apparatus 1400 is the access IAB node or the chip in the access IAB node, the processing unit 1401 may complete the method performed by the access IAB node in the foregoing embodiment.

In a possible design, the processing unit 1401 may include instructions, and the instructions may be run on a processor, so that the communication apparatus 1400 performs the method of the access IAB node in the foregoing embodiment.

In another possible design, the storage unit 1403 stores instructions, and the instructions may be run on the processing unit 1401, so that the communication apparatus 1400 performs the method of the access IAB node in the foregoing embodiment. Optionally, the storage unit 1403 may further store data. Optionally, the processing unit 1401 may also store instructions and/or data.

For example, the communication unit 1402 may receive configuration information from the donor CU, the communication unit 1402 may receive a data packet from the donor CU or another network device, and the processing unit 1401 may determine an RLC channel for transmitting the data packet or determine a mapping field. The communication unit 1402 may send the data packet to a parent node of the access IAB node through the RLC channel. For details, refer to content in the foregoing method embodiments.

The foregoing describes a method flowchart in this embodiment of this application. It should be understood that the donor CU may have a function unit (means) corresponding to a step of the method or procedure of the donor CU, and the donor DU may have a function unit corresponding to a step of the method or procedure of the donor DU. One or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedure.

The processor in this application may include but is not limited to at least one of the following computing devices that run software: a central processing unit (central processing unit, CPU), a microprocessor, a digital signal processor (DSP), a microcontroller unit (microcontroller unit, MCU), an artificial intelligence processor, or the like. Each computing device may include one or more cores configured to perform an operation or processing by executing software instructions. The processor may be an independent semiconductor chip, or may be integrated with another circuit to form a semiconductor chip. For example, the processor and another circuit (for example, an encoding/decoding circuit, a hardware acceleration circuit, or various buses and interface circuits) may form an SoC (system-on-a-chip). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (field programmable gate array, FPGA), a PLD (programmable logic device), or a logic circuit that implements a dedicated logic operation.

The memory in the embodiments of this application may include at least one of the following types: a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can carry or store expected program code in a form of instructions or a data structure and that can be accessed by a computer. However, the memory is not limited thereto.

In addition to a data bus, the bus may further include a power bus, a control bus, a status signal bus, and the like. However, for clear description, various types of buses in the figure are marked as the bus.

In an implementation process, steps in the foregoing methods may be implemented by using a hardware integrated logic circuit in the processor, or by using instructions in a form of software. The steps of the methods disclosed with reference to the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware of the processor. To avoid repetition, details are not described herein.

According to the method provided in the embodiments of this application, an embodiment of this application further provides a system, including the foregoing apparatus and one or more network devices.

It should be further understood that, "first", "second", "third", "fourth", and various numbers in this specification are merely used for differentiation for ease of description, and are not intended to limit the scope of the embodiments of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally represents an "or" relationship between the associated objects.

It should be understood that sequence numbers of the foregoing processes do not indicate an execution sequence in the various embodiments of this application. The execution sequence of the processes should be determined based on functions and internal logic of the processes, and should not be construed as any limitation on the implementation processes of the embodiments of this application.

A person of ordinary skill in the art may be aware that, various illustrative logical blocks (illustrative logical blocks) and steps (steps) that are described with reference to the embodiments disclosed in this specification may be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that, the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus for a donor distributed unit (DU) comprising at least one processor and a memory coupled to the at least one processor and storing programming instructions for execution by the at least one processor, wherein the programming instructions instruct the at least one processor to perform operations comprising:
receiving first configuration information from a donor centralized unit (CU) wherein the first configuration information indicates that when one or more respective values of one or more first fields in a data packet correspondingly meets one or more respective first value ranges, the data packet is transmitted through a first channel between the donor DU and a child node, the first configuration information further indicates that when one or more respective values of one or more second fields in the data packet correspondingly meets one or more respective second value ranges, the data packet is transmitted through a second channel that is between the donor DU and a child integrated access and backhaul (IAB) node, and the data packet meets only one of 1) the one or more respective first value ranges and 2) the one or more respective second value ranges; and
storing the first configuration information.

2. The communication apparatus according to claim 1, wherein the programming instructions further instruct the at least one processor to perform operations comprising:
receiving the data packet; and
transmitting the data packet through a first radio link control (RLC) channel when the one or more respective values of the one or more first fields in the data packet correspondingly meets the one or more respective first value ranges.

3. The communication apparatus according to claim 1, wherein the first configuration information includes a mapping relationship between the one or more respective first value ranges and an identifier of the first channel.

4. The communication apparatus according to claim 1, wherein the one or more first fields comprises at least one of a source Internet Protocol (IP) address, a destination IP address, a differentiated services code point, a flow label, a transport layer protocol type, a transport layer source port number, or a transport layer destination port number.

5. The communication apparatus according to claim 1, wherein the first configuration information includes a mapping relationship between the one or more respective second value ranges and an identifier of the second channel.

6. The communication apparatus according to claim 1, wherein the one or more second fields comprises at least one of a source Internet Protocol (IP) address, a destination IP address, a differentiated services code point, a flow label, a transport layer protocol type, a transport layer source port number, or a transport layer destination port number.

7. The communication apparatus according to claim 1, wherein at least one field in the one or more first fields is different from each of the one or more second fields.

8. The communication apparatus according to claim 1, wherein the operations further comprise:
sending a second configuration information to the donor DU, wherein the second configuration information indicates that the one or more respective values of the one or more first fields determines a channel that is between the donor DU and the child node and that is for transmitting the data packet.

9. A communication apparatus for a donor centralized unit (CU) comprising at least one processor and a memory coupled to the at least one processor and storing programming instructions for execution by the at least one processor, wherein the programming instructions instruct the at least one processor to perform operations comprising:
obtaining first configuration information, wherein the first configuration information indicates that when one or more respective values of one or more first fields in a data packet correspondingly meets one or more respective first value ranges,
the data packet is transmitted through a first channel that is between a donor distributed unit (DU) and a child node, the first configuration information further indicates that when one or more respective values of one or more second fields in the data packet correspondingly meets one or more respective second value ranges, the data packet is transmitted through a second channel that is between the donor DU and a child integrated access and backhaul (IAB) node, and the data packet meets only one of 1) the one or more respective first value ranges and 2) the one or more respective second value ranges; and
sending the first configuration information to the donor DU.

10. The communication apparatus according to claim 9, wherein the first configuration information includes a mapping relationship between the one or more respective first value ranges and an identifier of the first channel.

11. The communication apparatus according to claim 9, wherein the one or more first fields comprises one or more of a source Internet Protocol, IP, address, a destination IP address, a differentiated services code point, a flow label, a transport layer protocol type, a transport layer source port number, and a transport layer destination port number.

12. The communication apparatus according to claim 9, wherein the first configuration information includes a mapping relationship between the one or more respective second value ranges and an identifier of the second channel.

13. The communication apparatus according to claim 9, wherein the one or more second fields comprises at least one of a source Internet Protocol, IP, address, a destination IP address, a differentiated services code point, a flow label, a transport layer protocol type, a transport layer source port number, or a transport layer destination port number.

14. The communication apparatus according to claim 9, wherein at least one field in the one or more first fields is different from each of the one or more second fields.

15. The communication apparatus according to claim 9, wherein the operations further comprise:

sending a second configuration information to the donor DU, wherein the second configuration information indicates that the one or more respective values of the one or more first fields determines a channel that is between the donor DU and the child node and that is for transmitting the data packet.

16. A communication system, comprising a donor distributed unit (DU) and a donor centralized unit (CU) wherein:

the donor CU is configured to:

obtain first configuration information, wherein the first configuration information indicates that when one or more respective values of one or more first fields in a data packet correspondingly meets one or more respective first value ranges, the data packet is transmitted through a first channel that is between a donor DU and a child node, the first configuration information further indicates that when one or more respective values of one or more second fields in the data packet correspondingly meets one or more respective second value ranges, the data packet is transmitted through a second channel that is between the donor DU and a child integrated access and backhaul (IAB) node, and the data packet meets only one of 1) the one or more respective first value ranges and 2) the one or more respective second value ranges; and send the first configuration information to the donor DU; and the donor DU is configured to receive the first configuration information from the donor CU.

17. The communication system according to claim 16, wherein the donor DU is further configured to:

receive the data packet; and transmit the data packet through a first radio link control (RLC) channel, when the one or more respective values of the one or more first fields in the data packet correspondingly meets the one or more respective first value ranges.

18. The communication system according to claim 16, wherein the first configuration information includes a mapping relationship between the one or more respective first value ranges and an identifier of the first channel.

19. The communication system according to claim 16, wherein at least one field in the one or more first fields are different from each of the one or more second fields.

20. The communication system according to claim 16, wherein the donor DU is configured to receive a second configuration information from the donor CU, and the second configuration information indicates that the one or more respective values of the one or more first fields determines a channel that is between the donor DU and the child node and that is for transmitting the data packet.

\* \* \* \* \*